(12) United States Patent
Geng et al.

(10) Patent No.: US 11,943,831 B2
(45) Date of Patent: Mar. 26, 2024

(54) COMMUNICATION METHOD AND APPARATUS

(71) Applicant: HUAWEI TECHNOLOGIES CO., LTD., Guangdong (CN)

(72) Inventors: Tingting Geng, Shanghai (CN); Rui Wang, Shanghai (CN); Hongping Zhang, Shanghai (CN); Qinghai Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 252 days.

(21) Appl. No.: 17/488,150

(22) Filed: Sep. 28, 2021

(65) Prior Publication Data
US 2022/0022275 A1 Jan. 20, 2022

Related U.S. Application Data

(63) Continuation of application No. PCT/CN2020/082135, filed on Mar. 30, 2020.

(30) Foreign Application Priority Data

Mar. 28, 2019 (CN) .......................... 201910245865.7

(51) Int. Cl.
*H04W 76/19* (2018.01)
*H04W 24/04* (2009.01)
(52) U.S. Cl.
CPC ........... *H04W 76/19* (2018.02); *H04W 24/04* (2013.01)
(58) Field of Classification Search
CPC ...... H04W 76/15; H04W 76/19; H04W 24/04
See application file for complete search history.

(56) References Cited

U.S. PATENT DOCUMENTS

2018/0278357 A1 9/2018 Kim et al.
2020/0059395 A1* 2/2020 Chen .................. H04W 28/082
(Continued)

FOREIGN PATENT DOCUMENTS

CN 105075146 A 11/2015
CN 108882327 A 11/2018
(Continued)

OTHER PUBLICATIONS

3GPP TSG-RAN WG2 Meeting #101bis,R2-1805656,SCG failure handling for split bearer,Qualcomm Incorporated, Sanya, China, Apr. 16-20, 2018, total 4 pages.
(Continued)

*Primary Examiner* — Gary Mui
(74) *Attorney, Agent, or Firm* — HUAWEI TECHNOLOGIES CO., LTD.

(57) ABSTRACT

The embodiments of this application provide a communication method and an apparatus, and relate to the field of communications technologies, to successfully report MCG link failure information. The method includes: When a terminal device sends a first data unit to a first access network device via an MCG split bearer, the terminal device determines that an MCG link failure occurs. In addition, the terminal device sends a second data unit to a second access network device via an SCG split bearer, so that the second access network device sends the second data unit to the first access network device, where the second data unit includes information used to indicate the MCG link failure.

18 Claims, 11 Drawing Sheets

(56) References Cited

U.S. PATENT DOCUMENTS

| | | | |
|---|---|---|---|
| 2020/0305216 A1* | 9/2020 | Kim | H04W 76/19 |
| 2021/0385897 A1* | 12/2021 | Purkayastha | H04W 36/305 |
| 2022/0007259 A1* | 1/2022 | Fujishiro | H04W 72/04 |
| 2022/0086710 A1* | 3/2022 | Xu | H04W 48/16 |
| 2022/0110180 A1* | 4/2022 | Jung | H04W 76/19 |
| 2022/0159483 A1* | 5/2022 | Lee | H04W 76/19 |
| 2022/0174771 A1* | 6/2022 | Baek | H04W 76/19 |
| 2023/0040003 A1* | 2/2023 | Kim | H04W 76/18 |

FOREIGN PATENT DOCUMENTS

| | | |
|---|---|---|
| CN | 108924866 A | 11/2018 |
| CN | 109391959 A | 2/2019 |
| WO | 2018182231 A1 | 10/2018 |
| WO | 2020167012 A1 | 8/2020 |

OTHER PUBLICATIONS

VIVO: "Fast recovery of MCG link", 3GPP Draft; R2-1900265,Feb. 15, 2019 (Feb. 15, 2019), XP051601663,total 3 pages.

NTT Docomo et al: "Stage-2 level concept on fast recovery of MCG link", 3GPP Draft; R2-1902168, Feb. 15, 2019 (Feb. 15, 2019), XP051603511, total 3 pages.

Ericsson: "MCG failure handling in case of NE-DC and NR-DC", 3GPP Draft; R2-1814559,Sep. 27, 2018, pp. 1-4, XP051523984.

3GPP TSG-RAN WG2 Meeting#95bis,Tdoc R2-166494,RRC message related issues for LTE-NR tight interworking, Kaohsiung, Oct. 10-14, 2016, total 4 pages.

3GPP TS 36.331 V15.4.0 (Dec. 2018);3rd Generation Partnership Project;Technical Specification Group Radio Access Network;Evolved Universal Terrestrial Radio Access (E-UTRA);Radio Resource Control (RRC);Protocol specification (Release 15);total 933 pages.

3GPP TS 37.340 V15.4.0 (Dec. 2018), 3rd Generation Partnership Project; Technical Specification Group Radio Access Network; Evolved Universal Terrestrial Radio Access (E-UTRA) and NR; Multi-connectivity; Stage 2(Release 15), 67 pages.

3GPP TS 38.331 V15.4.0 (Dec. 2018), 3rd Generation Partnership Project; Technical Specification Group Radio Access Network;NR; Radio Resource Control (RRC) protocol specification(Release 15), 474 pages.

3GPP TS 38.423 V15.2.0:"3rd Generation Partnership Project; Technical Specification Group Radio Access Network; NG-RAN; Xn application protocol (XnAP) (Release 15)",Dec. 2018,total 281 pages.

* cited by examiner

COMMUNICATION METHOD AND APPARATUS

CROSS-REFERENCE TO RELATED APPLICATIONS

This application is a continuation of International Application No. PCT/CN2020/082135, filed on Mar. 30, 2020, which claims priority to Chinese Patent Application No. 201910245865.7, filed on Mar. 28, 2019. The disclosures of the aforementioned applications are herein incorporated by reference in their entireties.

TECHNICAL FIELD

This application relates to the field of communications technologies, and in particular, to a communication method and an apparatus.

BACKGROUND

In a dual connectivity (DC) architecture of communications systems, a data unit may be sent via radio resources of a master node (MN) and/or radio resources of a secondary node (SN). A manner of sending a data unit via the radio resources of the MN is referred to as a master cell group (MCG) bearer, a manner of sending a data unit via the radio resources of the SN is referred to as a secondary cell group (SCG) bearer, and a manner of sending a data unit via both the radio resources of the MN and the radio resources of the SN is referred to as a split bearer (split bearer). In the split bearer, a manner of sending a data unit via the radio resources of the MN is referred to as an MCG split bearer, and a manner of sending a data unit via the radio resources of the SN is referred to as an SCG split bearer.

A signalling radio bearer (SRB) includes an MCG signalling bearer, an SCG signalling bearer, and a split signalling bearer. The split signalling bearer may be configured as a split signalling bearer allowing duplication and a split signalling bearer without duplication. In a scenario in which a data unit is sent via the split signalling bearer, in a process in which a terminal device sends a data unit to an MN via an MCG split signalling bearer, an MCG link failure (that is, an MCG link failure) may occur. In this case, the terminal device needs to report an MCG link failure report (that is, an MCG failure report) to the MN, to implement fast MCG link recovery.

However, because the MCG link failure has occurred, the terminal device cannot continue to send the data unit via the MCG split signalling bearer. In this way, how to report the MCG link failure report of the terminal device to the MN is a problem that needs to be urgently resolved.

SUMMARY

This application provides a communication method and an apparatus, to successfully report MCG link failure information.

To achieve the foregoing objective, the following technical solutions are used in the embodiments of this application.

According to a first aspect, this application provides a communication method, applied to a scenario in which data is sent via a split bearer. The method includes: When a terminal device sends a first data unit to a first access network device via an MCG split bearer, the terminal device determines that an MCG link failure occurs. In addition, the terminal device sends a second data unit to a second access network device via an SCG split bearer, so that the second access network device sends the second data unit to the first access network device, where the second data unit includes information used to indicate the MCG link failure.

In this embodiment of this application, a cause of the MCG link failure may include at least one of the following: an MCG radio link failure (RLF), an re-configuration failure of the MCG (re-configuration failure of the MCG), a mobility from NR failure (mobility from NR failure), integrity check failure indication from lower layers concerning SRB1 or SRB2 (integrity check failure indication from lower layers concerning SRB1 or SRB2), an RRC connection reconfiguration failure (RRC connection reconfiguration failure), and the like. This is not specifically limited in this embodiment of this application.

According to the communication method provided in this embodiment of this application, when the terminal device determines that the MCG link failure occurs, the terminal device may send the second data unit to the second access network device via the SCG split bearer, so that the second access network device sends the second data unit to the first access network device, where the second data unit includes the information used to indicate the MCG link failure. Therefore, the first access network device can complete processing of the second data unit. In this way, MCG link failure information can be successfully reported.

In a possible implementation, the second data unit further includes first indication information, and the first indication information is used to indicate to preferentially process the second data unit.

In this embodiment of this application, that the first indication information is used to indicate to preferentially process the second data unit means that when the first access network device receives the second data unit, a packet data convergence protocol (PDCP) layer of the first access network device does not need to perform reordering and/or in-order delivery, and instead, preferentially processes the second data unit after receiving the second data unit.

In a possible implementation, the first indication information is carried in one or more of the following information: a media access control control element (MAC CE) header, an RLC header, or a PDCP header.

In a possible implementation, the second data unit is a PDCP control protocol data unit.

In this embodiment of this application, the PDCP control protocol data unit is introduced into a signaling radio bearer, and the information (for example, an MCG link failure report) used to indicate the MCG link failure and the first indication information are carried in the PDCP control protocol data unit. Specifically, one or more reserved bits in a header of the PDCP control protocol data unit are defined to carry the first indication information, and a payload of the PDCP control protocol data unit includes the information used to indicate the MCG link failure.

In a possible implementation, the first bit in the reserved bits (for example, four reserved bits) in the header of the PDCP control protocol data unit may be used to carry the first indication information, or one or more other reserved bits may be used to carry the first indication information. This is not limited in this embodiment of this application.

It should be noted that, in this embodiment of this application, a format of the PDCP control protocol data unit in the SRB is similar to a format of a PDCP control protocol data unit (PDCP control PDU) in a data radio bearer (data radio bearer, DRB). For the format of the PDCP control protocol data unit, refer to a format of a PDCP data protocol data unit. Details are not described in this embodiment of this application.

It may be understood that, during specific implementation, when only the first bit in the reserved bits is used for indication, the first bit is used as a D/C field parameter, and the D/C field parameter is used to indicate whether the data unit is a PDCP control PDU or a PDCP data PDU. In this embodiment of this application, when a value of a D/C field is "C", it indicates that the data unit is a PDCP control PDU, and a payload of the data unit includes the information used to indicate the MCG link failure, and indicates that the data unit needs to be preferentially processed, that is, indicates that the MCG link failure information needs to be preferentially processed. Optionally, if a remaining reserved bit (a remaining bit for short) is further used, the remaining bit may be used as a "PDU type" parameter (that is, a data unit type) to indicate a type of control information included in the PDCP control PDU. In this embodiment of this application, one possible value of the "PDU type" is set to the MCG link failure information, and other possible values of the "PDU type" may be reserved for future extension such as a PDCP status report (PDCP status report). Other possible extension is not limited in this embodiment of this application.

In a possible implementation, the communication method provided in this embodiment of this application may further include: When the terminal device does not receive an acknowledgment message that is for the first data unit and that is sent by the first access network device, the terminal device sends the first data unit to the second access network device via the SCG split bearer.

In this embodiment of this application, when the terminal device sends the first data unit to the first access network device via the MCG split bearer, the terminal device detects the MCG link failure. In this case, the first data unit sent by the terminal device to the first access network device via the MCG split bearer may fail to be sent to the first access network device, and further, the terminal device may not receive the acknowledgment message that is for the first data unit and that is sent by the first access network device. To ensure continuity of sequence numbers of data units received by the first access network device, the terminal device sends the first data unit to the second access network device via the SCG split bearer, so that the second access network device sends the first data unit to the first access network device.

In conclusion, a time sequence of receiving the first data unit and the second data unit by the first access network device via the SCG split bearer is not limited in this embodiment of this application. However, it should be understood that the first data unit is actually a data unit that is sent by the terminal device to the first access network device via the MCG bearer before the terminal device detects the MCG link failure. It can be learned that a PDCP SN of the first data unit is less than a PDCP SN of the second data unit. The first access network device delivers, in order, data units (which may be referred to as PDCP SDUs or MCG link failure information) processed by the PDCP layer, that is, delivers the data units to an RRC layer of the first access network device in ascending order of PDCP SNs. For example, the first access network device first delivers the processed first data unit, and then delivers the processed second data unit. It should be understood that, the foregoing delivered data units (including the delivered first data unit and/or the delivered second data unit) mean that the first access network device delivers, to the RRC layer of the first access network device, a data unit (which may be referred to as a PDCP SDU or MCG link failure information) obtained after a PDCP SN is removed from a PDCP PDU of the PDCP layer of the first access network device and processing such as decoding, integrity protection, and integrity check is performed. This is also similar in the following embodiments, and details are not described.

In this embodiment of this application, if the terminal device detects the MCG link failure when the terminal device sends the first data unit, the terminal device sends, to the second access network device via the SCG split bearer, the information used to indicate the MCG link failure. In addition, the terminal device also sends the first data unit to the second access network device via the SCG split bearer, or the terminal device resends the first data unit to the second access network device via the SCG split bearer, so that the second access network device sends the first data unit to the first access network device. It can be learned that according to this solution, continuity of data units received by the first access network device can be ensured. In this way, the MCG link failure information can be successfully reported.

In a possible implementation, when the terminal device determines that the MCG link failure occurs, the terminal device sends only the second data unit via the SCG split bearer, and the terminal device does not send the first data unit via the SCG split bearer. Even if the first data unit is still stored in buffer of the PDCP layer of the terminal device in a case of the MCG link failure, the terminal device does not send the first data unit via the SCG split bearer, either. It may be understood that, when the SCG split bearer is configured as a split bearer without duplication and only an MCG path is configured, usually, the first access network device cannot receive, from the second access network device, data transmitted via the SCG split bearer. However, this embodiment of this application may specify that: If the first access network device receives the second data unit from the second access network device, the first access network device preferentially delivers the processed second data unit to the RRC layer of the first access network device. It may also be understood as follows: When the first access network device receives the second data unit via the SCG split bearer, the first access network device determines, by default, that the second data unit includes the information used to indicate the MCG link failure. Regardless of whether SNs of PDCP PDUs of the first access network device are continuous, the PDCP layer of the first access network device does not perform a reordering function and/or an in-order delivery function, but preferentially delivers the processed second data unit to the RRC layer.

In this embodiment of this application, the terminal device sends, to the first access network device via the SCG split bearer, the data unit including the information used to indicate the MCG link failure. According to this solution, it can be ensured that after receiving the data unit, the first access network device preferentially processes the data unit. In this way, the MCG link failure information can be successfully reported.

In a possible implementation, the communication method provided in this embodiment of this application may further include: The terminal device receives second indication information sent by the first access network device, where the second indication information is used to indicate a type of an SRB via which the second data unit is sent.

In this embodiment of this application, the first access network device may indicate the type of the SRB via which the terminal device sends the data unit to the second access network device. Specifically, the second indication information may indicate the terminal device to send the second data unit or the MCG link failure information via an SCG split SRB1, an SCG split SRB2, an SRB3, or another newly defined SRB. In this way, when the terminal device sends the second data unit to the second access network device via the SCG split bearer, the terminal device may send the MCG link failure information via a corresponding SRB.

Optionally, the second indication information may be carried in an RRC reconfiguration message, or may be carried in an RRC connection reconfiguration message, or may be carried in another message. This is not specifically limited in this embodiment of this application.

In a possible implementation, a specific type of an SRB via which the terminal device sends the MCG link failure information may be further predefined in a protocol. For example, it is predefined in the protocol that the MCG link failure information is sent via the SCG split SRB1. In this way, when the terminal device determines that the MCG link failure occurs, the terminal device may send, via the SCG split SRB1 predefined in the protocol, the second data unit that carries the MCG link failure information.

In a possible implementation, when the terminal device determines that the MCG link failure occurs or the terminal device sends the second data unit including the MCG link failure information to the second access network device, the terminal device may start a timer. If the timer expires and the terminal device does not receive a response message from the first access network device or the second access network device, the terminal device considers that MCG link recovery fails. If the terminal device receives a response message from the first access network device or the second access network device while the timer is running, the terminal device stops the timer.

Optionally, when the timer expires and the terminal device does not receive a response message from the first access network device or the second access network device, the terminal device performs an RRC reestablishment procedure, to reestablish an MCG link, so as to recover data transmission via the MCG link.

It may be understood that running duration of the timer may be a value received by the terminal device from the first access network device, or may be a value predefined in a protocol. This is not limited in this embodiment of this application.

According to a second aspect, an embodiment of this application provides a communication method, applied to a scenario in which data is sent via a split bearer. The method includes: A first access network device receives a second data unit from a second access network device via an SCG split bearer, where the second data unit is a data unit that is sent by a terminal device to the second access network device via the SCG split bearer, and the second data unit includes information used to indicate an MCG link failure. In addition, the first access network device processes the second data unit.

In this embodiment of this application, after the second access network device receives the second data unit, the second access network device sends the second data unit to the first access network device via the SCG split bearer, so that the first access network device receives the second data unit from the second access network device. Specifically, the second access network device sends the received second data unit from an RLC layer of the second access network device to a PDCP layer of the first access network device via an SCG RLC bearer in the SCG split bearer.

After the first access network device receives the second data unit, the first access network device completes processing (including at least one of PDCP SN maintenance, data packet header compression and decompression, encryption and decryption, integrity protection, integrity check, PDCP header adding, data routing or replication, and the like) on the second data unit at the PDCP layer of the first access network device, sorts all received data units (including the second data unit) based on PDCP SNs, and then delivers the processed data units (which may be referred to as PDCP SDUs or may be referred to as MCG link failure information) to an RRC layer of the first access network device in a sequence of the PDCP SNs. The RRC layer further processes the MCG link failure information included in the processed data units.

In a possible implementation, the second data unit further includes first indication information, and the first indication information is used to indicate to preferentially process the second data unit.

In a possible implementation, the first indication information is carried in one or more of the following information: a MAC CE header, an RLC header, or a PDCP header.

In a possible implementation, the second data unit is a PDCP control protocol data unit.

In a possible implementation, the communication method provided in this embodiment of this application may further include: The first access network device receives a first data unit from the second access network device via the SCG split bearer.

In a possible implementation, the communication method provided in this embodiment of this application may further include: The first access network device sends second indication information to the terminal device, where the second indication information is used to indicate a type of an SRB via which the second data unit is sent.

For descriptions of related content and technical effects of the possible implementations of the second aspect, refer to descriptions of the possible implementations of the first aspect. Details are not described herein again.

According to a third aspect, an embodiment of this application provides a terminal device, including a determining module and a sending module. The determining module is configured to: In a process of sending a first data unit to a first access network device via an MCG split bearer, determine that an MCG link failure occurs. The sending module is configured to send a second data unit to a second access network device via an SCG split bearer, so that the second access network device sends the second data unit to the first access network device, where the second data unit includes information used to indicate the MCG link failure.

In a possible implementation, the second data unit further includes first indication information, and the first indication information is used to indicate to preferentially process the second data unit.

In a possible implementation, the first indication information is carried in one or more of the following information: a MAC CE header, an RLC header, or a PDCP header.

In a possible implementation, the second data unit is a PDCP control protocol data unit.

In a possible implementation, the sending module is further configured to: When the terminal device does not receive an acknowledgment message that is for the first data unit and that is sent by the first access network device, send the first data unit to the second access network device via the SCG split bearer.

In a possible implementation, the terminal device provided in this embodiment of this application may further include a receiving module. The receiving module is configured to receive second indication information sent by the first access network device, where the second indication information is used to indicate a type of an SRB via which the second data unit is sent.

According to a fourth aspect, an embodiment of this application provides an access network device. The access network device is a first access network device, and the access network device includes a receiving module and a processing module. The receiving module is configured to receive a second data unit from a second access network device via an SCG split bearer, where the second data unit is a data unit that is sent by a terminal device to the second access network device via the SCG split bearer, and the second data unit includes information used to indicate an MCG link failure. The processing module is configured to process the second data unit.

In a possible implementation, the second data unit further includes first indication information, and the first indication information is used to indicate to preferentially process the second data unit.

In a possible implementation, the first indication information is carried in one or more of the following information: a MAC CE header, an RLC header, or a PDCP header.

In a possible implementation, the second data unit is a PDCP control protocol data unit.

In a possible implementation, the receiving module is further configured to receive a first data unit from the second access network device via the SCG split bearer.

In a possible implementation, the access network device provided in this embodiment of this application may further include a sending module. The sending module is configured to send second indication information to the terminal device, where the second indication information is used to indicate a type of an SRB via which the second data unit is sent.

According to a fifth aspect, an embodiment of this application provides a terminal device. The terminal device includes a processor and a memory coupled to the processor. The memory is configured to store a computer instruction. When the terminal device runs, the processor executes the computer instruction stored in the memory, so that the terminal device performs the communication method according to any one of the first aspect and the possible implementations of the first aspect.

According to a sixth aspect, an embodiment of this application provides a terminal device. The terminal device exists in the product form of a chip, and a structure of the terminal device includes a processor and a memory. The memory is configured to be coupled to the processor, and the memory is configured to store a computer instruction. The processor is configured to execute the computer instruction stored in the memory, so that the terminal device performs the communication method according to any one of the first aspect and the possible implementations of the first aspect.

According to a seventh aspect, an embodiment of this application provides a computer readable storage medium. The computer readable storage medium may include a computer instruction, and when the computer instruction is run on a computer, a terminal device is enabled to perform the communication method according to any one of the first aspect and the possible implementations of the first aspect.

According to an eighth aspect, an embodiment of this application provides a computer program product including a computer instruction. When the computer program product is run on a computer, a terminal device is enabled to perform the communication method according to any one of the first aspect and the possible implementations of the first aspect.

According to a ninth aspect, an embodiment of this application provides an access network device. The access network device is a first access network device. The access network device includes a processor and a memory coupled to the processor. The memory is configured to store a computer instruction. When the access network device runs, the processor executes the computer instruction stored in the memory, so that the access network device performs the communication method according to any one of the second aspect and the possible implementations of the second aspect.

According to a tenth aspect, an embodiment of this application provides an access network device. The access network device is a first access network device. The access network device exists in the product form of a chip, and a structure of the access network device includes a processor and a memory. The memory is configured to be coupled to the processor, and the memory is configured to store a computer instruction. The processor is configured to execute the computer instruction stored in the memory, so that the access network device performs the communication method according to any one of the second aspect and the possible implementations of the second aspect.

According to an eleventh aspect, an embodiment of this application provides a computer readable storage medium. The computer readable storage medium may include a computer instruction, and when the computer instruction is run on a computer, an access network device is enabled to perform the communication method according to any one of the second aspect and the possible implementations of the second aspect.

According to a twelfth aspect, an embodiment of this application provides a computer program product including a computer instruction. When the computer program product is run on a computer, an access network device is enabled to perform the communication method according to any one of the second aspect and the possible implementations of the second aspect.

According to a thirteenth aspect, an embodiment of this application provides a wireless communications system. The wireless communications system includes the terminal device according to the third aspect, and the first access network device and the second access network device according to the fourth aspect. Alternatively, the wireless communications system includes the terminal device according to the fifth aspect or the sixth aspect, and the first access network device and the second access network device according to the ninth aspect or the tenth aspect.

It should be understood that, for beneficial effects achieved by the technical solutions in the fourth aspect to the twelfth aspect and the corresponding possible implementations of the fourth aspect to the twelfth aspect of the embodiments of this application, refer to the foregoing technical effects of the first aspect and the corresponding possible implementations of the first aspect or the second aspect and the corresponding possible implementations of the second aspect. Details are not described herein again.

DESCRIPTION OF EMBODIMENTS

Figure 1A:
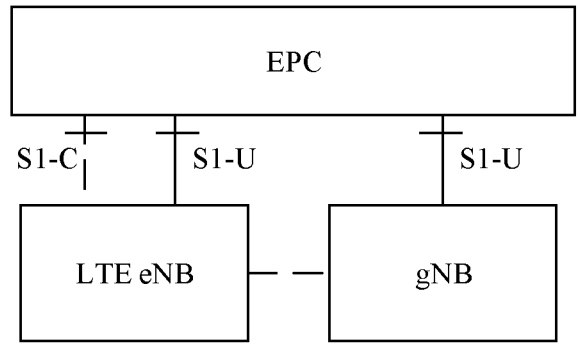
FIG. 1(*a*) to FIG. 1(*c*) are schematic diagrams of three DC architectures according to an embodiment of this application.

The term "and/or" in this specification describes only an association relationship for describing associated objects and represents that three relationships may exist. For example, A and/or B may represent the following three cases: Only A exists, both A and B exist, and only B exists.

In the specification and claims in the embodiments of this application, the terms "first", "second", and the like are intended to distinguish between different objects, but are not used to describe a particular order of the objects. For example, the first access network device, the second access network device, and the like are used to distinguish between different access network devices, but are not used to describe a specific order of the access network devices.

In the embodiments of this application, the word such as "example" or "for example" is used to represent giving an example, an illustration, or a description. Any embodiment or design scheme described as the word "example" or "for example" in the embodiments of this application should not be explained as being more preferred or having more advantages than another embodiment or design scheme. Exactly, use of the word such as "example" or "for example" is intended to present a related concept in a specific manner.

In descriptions of the embodiments of this application, unless otherwise stated, "a plurality of" means two or more. For example, a plurality of processing units are two or more processing units, and a plurality of systems are two or more systems.

First, some concepts related to a communication method and an apparatus provided in the embodiments of this application are described.

Dual connectivity (DC) architecture: Two access network devices (for example, base stations) are supported to simultaneously provide a data transmission service for one terminal device. For example, the access network devices are base stations. One of the two base stations is a primary base station, and the other base station is a secondary base station. A base station in a primary cell (PCell) is referred to as a primary base station, a base station in a primary secondary cell (PSCell) is a secondary base station, and the primary base station is a control plane anchor. The terminal device establishes a radio resource control (RRC) connection to the primary base station, the primary base station establishes a control plane connection to a core network, and an RRC message is transmitted between the primary base station and the terminal device. Optionally, some RRC messages (for example, a measurement configuration message and a measurement report) may also be transmitted between the secondary base station and the terminal device.

It should be noted that the access network device may be an independent base station, or may be another radio access network element, for example, a distributed unit (DU) or another device having a protocol stack.

Master cell group (MCG): A plurality of cells served by a primary base station form a master cell group, and the master cell group includes one PCell and one or more SCells.

Secondary cell group (SCG): A plurality of cells served by a secondary base station form a secondary cell group, and the secondary cell group includes one PSCell and one or more S Cells.

In the embodiments of this application, in the DC architecture, a device that acts as a primary base station is usually referred to as a master node (MN), or may be referred to as an anchor. A device that acts as a secondary base station is referred to as a secondary node (SN). Both the master node and the secondary node may be eNBs in a long term evolution (ILTE) network, or gNBs in a 5G new radio (NR) network. The core network may be a core network in the LTE network, for example, an evolved packet core (EPC) network. The core network may alternatively be a core network in the 5G NR network and is referred to as a 5G core network (5GC).

Figure 1B:
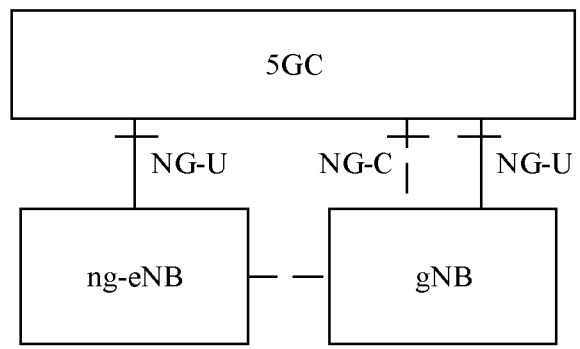
Figure 1C:
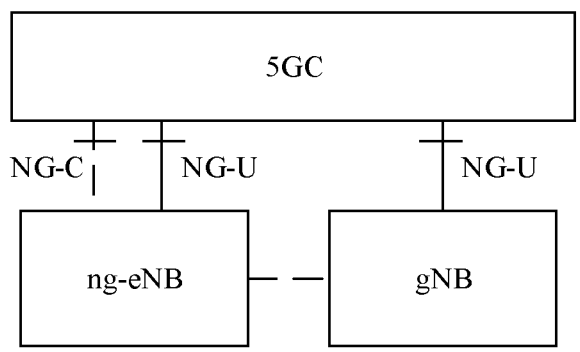

When the master node, the secondary node, and the core network are base stations and core networks in the foregoing different networks, a plurality of DC architectures may be formed. For example, in the standard specification, FIG. 1(*a*) is an Option 3 DC architecture, which is also referred to as an EN-DC (that is, E-UTRA NR DC) architecture. In the EN-DC architecture, a master node is an eNB (marked as an LTE eNB in the figure) in the LTE network, and a secondary node is a gNB (marked as a gNB in the figure) in the 5G NR network. In addition, both the master node and the secondary node are connected to the EPC, and the master node and the secondary node provide radio transmission resources for data transmission between a terminal device and the EPC. FIG. 1(*b*) is an Option 4 DC architecture, which is also referred to as an NE-DC (that is, NR E-UTRA DC) architecture. In the NE-DC architecture, a master node is a gNB (marked as a gNB in the figure) in the 5G NR network, and a secondary node is an eNB (marked as an ng-eNB in the figure) in the LTE network. In addition, both the master node and the secondary node are connected to the 5GC, and the master node and the secondary node provide radio transmission resources for data transmission between a terminal device and the 5GC. FIG. 1(*c*) is an Option 7 DC architecture, which is also referred to as an NG EN-DC (that is, next generation E-UTRANR DC) architecture. In the NG EN-DC architecture, a master node is an eNB (marked as a gNB ng-eNB in the figure) in the LTE network, and the secondary node is a gNB (marked as a gNB in the figure) in the 5G NR network. In addition, both the master node and the secondary node are connected to the 5GC, and the master node and the secondary node provide radio transmission resources for data transmission between a terminal device and the 5GC.

Optionally, in addition to the several DC architectures in the foregoing examples, another DC architecture may be further included, for example, a case in which both the master node and the secondary node are gNBs in the 5G NR. Details are not described in the embodiments of this application.

A signalling radio bearer (SRB) is a radio bearer (RB) used to transmit an RRC message and a non-access stratum (NAS) message. A type of the SRB may include an SRB0, an SRB1, an SRB2, an SRB3, or an SRB of another type. The SRB0 is a default bearer, and uses a common control channel (CCCH). The SRB1 is used to transmit an RRC message and a NAS message before the SRB2 is established, and uses a dedicated control channel (DCCH). The SRB2 is used to transmit a NAS message, has a priority lower than that of the SRB1, and uses a DCCH logical channel. The SRB3 is used to directly transmit an RRC message on an SN path, and uses a DCCH logical channel.

In the embodiments of this application, in the DC architecture, the terminal device may establish two types of radio bearers. The first type of radio bearer is a bearer for which PDCP is terminated in the MN (referred to as an MN terminated bearer in the standard specification), and is referred to as an MN bearer for short in this specification. For the MN bearer, a PDCP on a base station side is located in the MN, and a PDCP layer of the MN performs security-related processing. The second type of radio bearer is a bearer for which PDCP is terminated in the SN (referred to as an SN terminated bearer in the standard specification), and is referred to as an SN bearer for short in this specification. For the SN bearer, a PDCP on a base station side is terminated in the SN, and a PDCP layer of the SN performs security-related processing.

It may be understood that, for both the MN and the SN, processing on a data unit includes processing at a physical (PHY) layer, a media access control (MAC) layer, a radio link control (RLC) layer, and a PDCP layer. For the MN, processing on a data unit includes processing at an MN MAC layer, an MN RLC layer, and a PDCP layer. For the SN, processing on a data unit includes processing at an SN MAC layer, an SN RLC layer, and a PDCP layer. Data unit transmission at the PDCP layer is mainly described in the embodiments of this application.

Figure 2A:
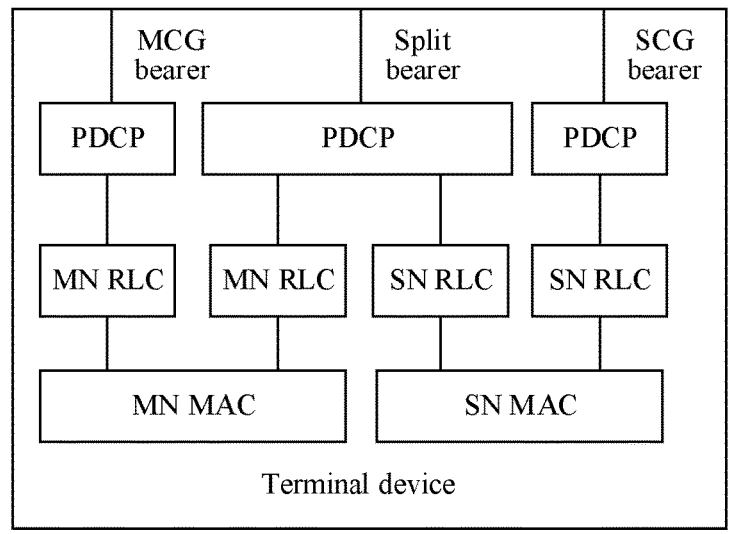
FIG. 2(*a*) and FIG. 2(*b*) are schematic diagrams of various different bearers according to an embodiment of this application.
Figure 2B:
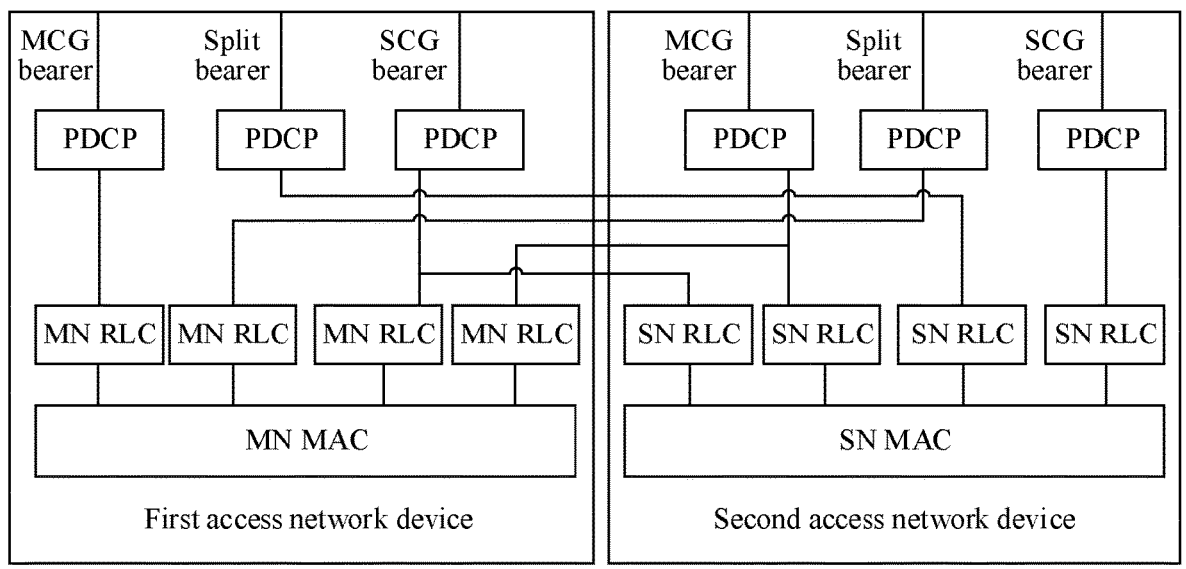

In the embodiments of this application, a data unit of the MN bearer may be sent via MN radio resources and/or SN radio resources, and a data unit of the SN bearer may be sent via the MN radio resources and/or the SN radio resources. Sending a data unit only via the MN radio resources is referred to as sending the data unit via an MCG bearer. Sending a data unit only via the SN radio resources is referred to as sending the data unit via an SCG bearer. Sending a data unit via both the MN radio resources and the SN radio resources is referred to as sending the data unit via a split bearer. The split bearer includes an MCG split bearer and an SCG split bearer. In an implementation, the terminal device may send a data unit to the MN via the MCG split bearer, the terminal device may send a data unit to the SN via the SCG split bearer, and then the SN sends the data unit to the MN. For example, FIG. 2(a) shows an MCG bearer, an SCG bearer, and a split bearer from a perspective of a terminal device, and FIG. 2(b) shows an MCG bearer, an SCG bearer, and a split bearer from a perspective of an access network device.

It should be understood that the bearer includes a signalling radio bearer and a data radio bearer. In the embodiments of this application, when the terminal device sends data via a split signalling radio bearer, a network side (for example, a base station) may configure the split signalling radio bearer to allow duplication or not to support duplication. In this way, the split signalling radio bearer may be classified into a split signalling radio bearer allowing duplication of RRC PDUs (split SRB allowing duplication of RRC PDUs) and a split signalling radio bearer without duplication (split SRB without duplication). The following briefly describes the split SRB allowing duplication and the split signalling radio bearer without duplication.

Split SRB allowing duplication: In a process of sending data via a split signalling radio bearer, an MCG split signalling radio bearer and an SCG split signalling radio bearer are configured to allow duplication. That is, a data unit is sent via the MCG split signalling radio bearer, a data unit is sent via the SCG split signalling radio bearer, and the data unit sent via the MCG split signalling radio bearer is the same as the data unit sent via the SCG split signalling radio bearer.

Split signalling radio bearer without duplication: In a process of sending data via a split signalling radio bearer, an MCG split signalling radio bearer and an SCG split signalling radio bearer are configured not to support duplication. It should be understood that, that the split signalling radio bearer is configured not to support duplication means that a data unit is sent via the MCG split signalling radio bearer, but a data unit is not sent via the SCG split signalling radio bearer. Alternatively, that the split bearer is configured not to support duplication means that a data unit sent via the MCG split bearer is different from a data unit sent via the SCG split bearer. For example, a data unit sent by the terminal device via the MCG split bearer is a first data unit, a data unit sent by the terminal device via the SCG split bearer is a second data unit, and the first data unit and the second data unit are different data units.

It should be noted that, for brevity of description, in the embodiments of this application, unless otherwise specified, a bearer is a signalling radio bearer. For example, an MCG bearer is an MCG signalling radio bearer, an SCG bearer is an SCG signalling radio bearer, a split bearer is a split signalling radio bearer, a split bearer allowing duplication is a split signalling radio bearer allowing duplication, a split bearer without duplication is a signalling radio bearer without duplication, an MCG split bearer is an MCG split signalling radio bearer, and an SCG split bearer is an SCG split signalling radio bearer.

In conclusion, the communication method provided in the embodiments of this application is mainly applied to a scenario in which data is sent via a split bearer in a communications system of a DC architecture, and relates to a PDCP layer of an access network device. Functions of the PDCP layer mainly include at least one of the following functions: PDCP sequence number (SN) maintenance, packet header compression and decompression, encryption and decryption, integrity protection, integrity check, reordering, in-order delivery, PDCP header adding, data routing or replication, and the like. For example, a transmit end is a terminal device, and a receive end is an access network device. After the access network device receives data units sent by the terminal via a split bearer, at a PDCP layer of the access network device, the access network device reorders the plurality of processed data units based on PDCP SNs of the data units received by the access network device, and delivers the plurality of processed data units to a higher layer (that is, a radio resource control (RRC) layer of the access network device) in order.

Based on an existing problem described in the background, the embodiments of this application provide a communication method and an apparatus, and are applied to a scenario in which data is sent via a split bearer. When a terminal device sends a first data unit to a first access network device via an MCG split bearer, the terminal device determines that an MCG link failure occurs. The terminal device sends a second data unit to a second access network device via an SCG split bearer, so that the second access network device sends the second data unit to the first access network device, and the first access network device can complete processing of the second data unit, where the second data unit includes information used to indicate the MCG link failure. According to the technical solutions provided in the embodiments of this application, MCG link failure information can be successfully reported.

Figure 3:
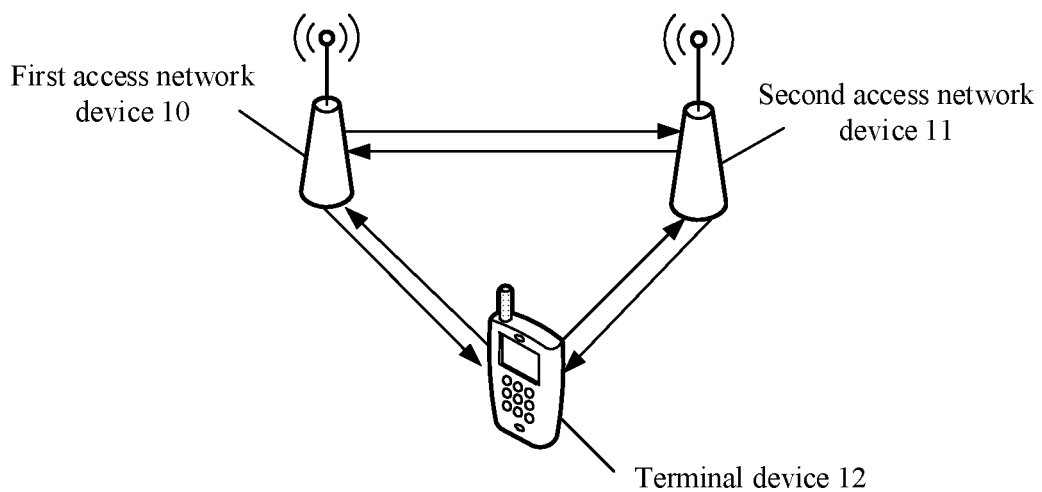
FIG. 3 is a schematic architectural diagram of a wireless communications system according to an embodiment of this application.

FIG. 3 is a schematic architectural diagram of a wireless communications system according to an embodiment of this application. The wireless communications system is of a DC architecture. As shown in FIG. 3, the wireless communications system includes a first access network device 10, a second access network device 11, and a terminal device 12. The first access network device 10 is a master node, the second access network device 11 is a secondary node, and the first access network device 10 and the second access network device 11 are connected to a core network of an LTE network or a 5GC. The terminal device 12 may separately communicate with the first access network device 10 and the second access network device 11. The terminal device 12 and the first access network device 10 may transmit data to each other via an MCG bearer or an MCG split bearer, and the terminal device 12 and the second access network device 11 may transmit data to each other via an SCG bearer or an SCG split bearer.

Figure 4:
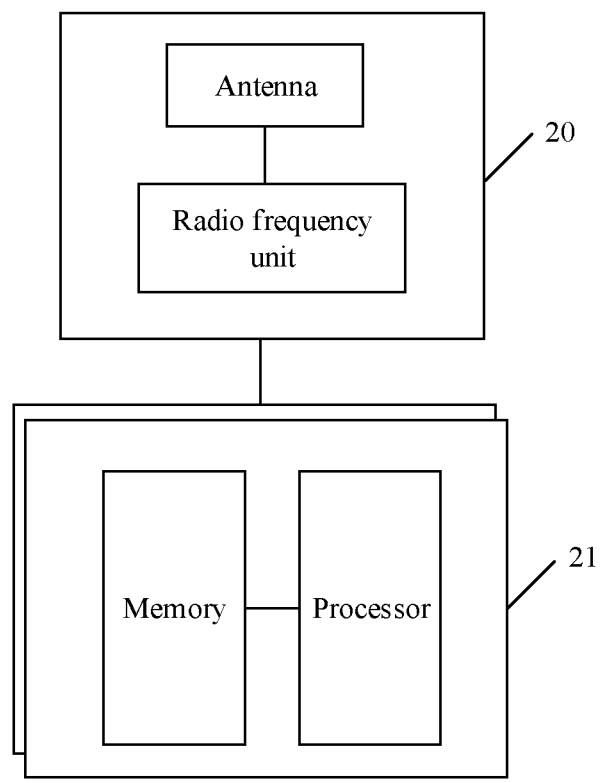
FIG. 4 is a schematic diagram of a hardware structure of a base station according to an embodiment of this application.

In the embodiments of this application, the access network device may be a base station. The base station may be a commonly used base station, an evolved node base station (eNB), a next generation node base station (gNB), a new radio eNB (new radio eNB), a macro base station, a micro base station, a high frequency base station, a transmission and reception point (TRP), or the like. For example, in the embodiments of this application, the commonly used base station is used as an example to describe a hardware structure of the access network device. The following specifically describes components of the base station provided in the embodiments of this application with reference to FIG. 4. As shown in FIG. 4, the base station provided in the embodiments of this application may include a part 20 and a part 21. The part 20 is mainly configured to send and receive a radio frequency signal, and perform conversion between the radio frequency signal and a baseband signal. The part 21 is mainly configured to perform baseband processing, control the base station, and the like. The part 20 may usually be referred to as a transceiver unit, a transceiver machine, a transceiver circuit, a transceiver, or the like. The part 21 is usually a control center of the base station, and is usually referred to as a processing unit.

The transceiver unit in the part 20 may also be referred to as a transceiver machine, a transceiver, or the like, and includes an antenna and a radio frequency unit, or includes only a radio frequency unit or a part thereof. The radio frequency unit is mainly configured to perform radio frequency processing. Optionally, a component that is in the part 20 and that is configured to implement a receiving function may be considered as a receiving unit, and a component that is configured to implement a sending function may be considered as a sending unit. In other words, the part 20 includes the receiving unit and the sending unit. The receiving unit may also be referred to as a receiver machine, a receiver, a receiver circuit, or the like, and the sending unit may be referred to as a transmitter machine, a transmitter, a transmitter circuit, or the like.

The part 21 may include one or more boards or chips. Each board or chip may include one or more processors and one or more memories. The processor is configured to read and execute a program in the memory, to implement a baseband processing function and control the base station. If there is a plurality of boards, the boards may be interconnected to improve a processing capability. In an optional implementation, a plurality of boards may share one or more processors, or a plurality of boards share one or more memories. The memory and the processor may be integrated together, or may be independently disposed. In some embodiments, the part 20 and the part 21 may be integrated together, or may be disposed independently. In addition, all functions of the part 21 may be integrated into one chip for implementation. Alternatively, some functions may be integrated into one chip for implementation and some other functions are integrated into one or more other chips for implementation. This is not limited in the embodiments of this application.

The terminal device in the embodiments of the present invention may be a mobile phone, a tablet computer, a notebook computer, an ultra-mobile personal computer (UMPC), a netbook, a personal digital assistant (PDA), or the like.

Figure 5:
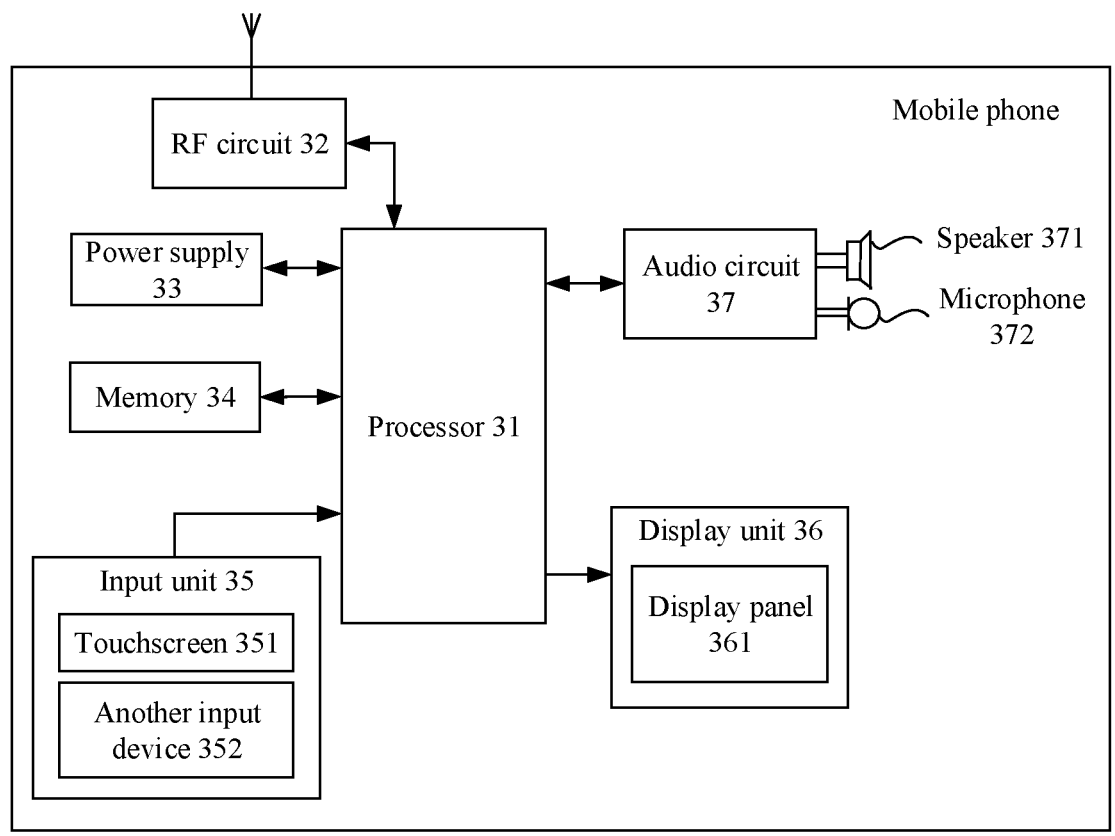
FIG. 5 is a schematic diagram of a hardware structure of a mobile phone according to an embodiment of this application.

An example in which the terminal device is a mobile phone is used. The following describes each component of the mobile phone in the embodiments of this application in detail with reference to FIG. 5. As shown in FIG. 5, the mobile phone provided in the embodiments of the present invention includes components such as a processor 31, a radio frequency (RF) circuit 32, a power supply 33, a memory 34, an input unit 35, a display unit 36, and an audio circuit 37. A person skilled in the art may understand that a structure of the mobile phone shown in FIG. 5 constitutes no limitation on the mobile phone, and the mobile phone may include more or fewer components than those shown in FIG. 5, or may include a combination of some of the components shown in FIG. 5, or may include components arranged differently from those shown in FIG. 5.

The processor 31 is a control center of the mobile phone, is connected to all parts of the entire mobile phone through various interfaces and lines, and executes various functions of the mobile phone and performs data processing by running or executing a software program and/or a module stored in the memory 34 and by invoking data stored in the memory 34, to perform overall monitoring on the mobile phone. Optionally, the processor 31 may include one or more processing units. Preferably, the processor 31 may integrate an application processor and a modem processor. The application processor mainly processes an operating system, a user interface, an application program, and the like. The modem processor mainly processes wireless communication. It may be understood that, the modem processor may not be integrated into the processor 31.

The RF circuit 32 may be configured to receive and send information, or receive and send a signal during a call, in particular, send received downlink information of a base station to the processor 31 for processing, and send uplink data to the base station. Generally, an RF circuit includes but is not limited to an antenna, at least one amplifier, a transceiver, a coupler, a low noise amplifier (LNA), a duplexer, and the like. In addition, the RF circuit 32 may further communicate with a network and another device through wireless communication. The wireless communication may use any communications standard or protocol, including but not limited to a global system for mobile communications (GSM), a general packet radio service (GPRS), code division multiple access (CDMA), wideband code division multiple access (WCDMA), long term evolution (LTE), an email, a short message service (SMS), and the like.

The mobile phone includes the power supply 33 (such as a battery) that supplies power to each component. Optionally, the power supply may be logically connected to the processor 31 through a power management system, to implement functions such as charging management, discharging management, and power consumption management by using the power management system.

The memory 34 may be configured to store a software program and a module. The processor 31 runs the software program and the module that are stored in the memory 34, to implement various function applications and data processing of the mobile phone. The memory 34 may mainly include a program storage area and a data storage area. The program storage area may store an operating system, an application program required by at least one function (such as a sound play function and an image play function), and the like. The data storage area may store data (such as audio data, image data, and an address book) created based on use of the mobile phone, and the like. In addition, the memory 34 may include a high-speed random access memory, and may further include a non-volatile memory, such as at least one magnetic disk storage device, a flash memory device, or another volatile solid-state storage device.

The input unit 35 may be configured to receive input digital or character information, and generate a key signal input related to user setting and function control of the mobile phone. Specifically, the input unit 35 may include a touchscreen 351 and another input device 352. The touchscreen 351 is also referred to as a touch panel, and can collect touch operations performed by a user on or near the touchscreen 351 (for example, an operation performed by the user on or near the touchscreen 351 by using any proper object or accessory such as a finger or a stylus), and drive a corresponding connection apparatus according to a preset program. Optionally, the touchscreen 351 may include two components: a touch detection apparatus and a touch controller. The touch detection apparatus detects a touch location of the user, detects a signal generated by the touch operation, and transfers the signal to the touch controller. The touch controller receives touch information from the touch detection apparatus, converts the touch information into touch coordinates, then transmits the touch coordinates to the processor 31, and receives and executes a command sent by the processor 31. In addition, the touchscreen 351 may be implemented by using a plurality of types such as a resistor type, a capacitor type, an infrared type, and a surface acoustic wave type. The another input device 352 may include but is not limited to one or more of a physical keyboard, a function button (such as a volume control button or a power button), a trackball, a mouse, or a joystick.

The display unit 36 may be configured to display information entered by the user or information provided for the user, and various menus of the mobile phone. The display unit 36 may include a display panel 361. Optionally, the display panel 361 may be configured in a form of a liquid crystal display (LCD), an organic light-emitting diode (OLED), or the like. Further, the touchscreen 351 may cover the display panel 361. After detecting a touch operation on or near the touchscreen 351, the touchscreen 351 sends the touch operation to the processor 31 to determine a type of a touch event. Then the processor 31 provides a corresponding visual output on the display panel 361 based on the type of the touch event. Although, in FIG. 5, the touchscreen 351 and the display panel 361 are used as two independent components to implement input and output functions of the mobile phone, in some embodiments, the touchscreen 351 and the display panel 361 may be integrated to implement the input and output functions of the mobile phone.

The audio circuit 37, a speaker 371, and a microphone 372 provide an audio interface between the user and the mobile phone. The audio circuit 37 may transmit, to the speaker 371, an electrical signal converted from received audio data, and the speaker 371 converts the electrical signal into a sound signal for output. In addition, the microphone 372 converts a collected sound signal into an electrical signal. The audio circuit 37 receives the electrical signal, converts the electrical signal into audio data, and then outputs the audio data to the RF circuit 32, to send the audio data to, for example, another mobile phone, or outputs the audio data to the memory 34 for further processing.

Optionally, the mobile phone shown in FIG. 5 may further include various sensors, for example, a gyroscope sensor, a hygrometer sensor, an infrared sensor, and a magnetometer sensor. Details are not described herein.

Optionally, the mobile phone shown in FIG. 5 may further include a wireless fidelity (Wi-Fi) module, a Bluetooth module, and the like. Details are not described herein.

It may be understood that in the embodiments of this application, the terminal device and/or the access network device may perform some or all steps in the embodiments of this application. These steps or the operations are merely examples. In the embodiments of this application, other operations or variations of various operations may be further performed. In addition, the steps may be performed in different sequences presented in the embodiments of this application, and not all operations in the embodiments of this application may be performed. The embodiments of this application may be implemented separately, or may be implemented in any combination. This is not limited in this application.

Figure 6:
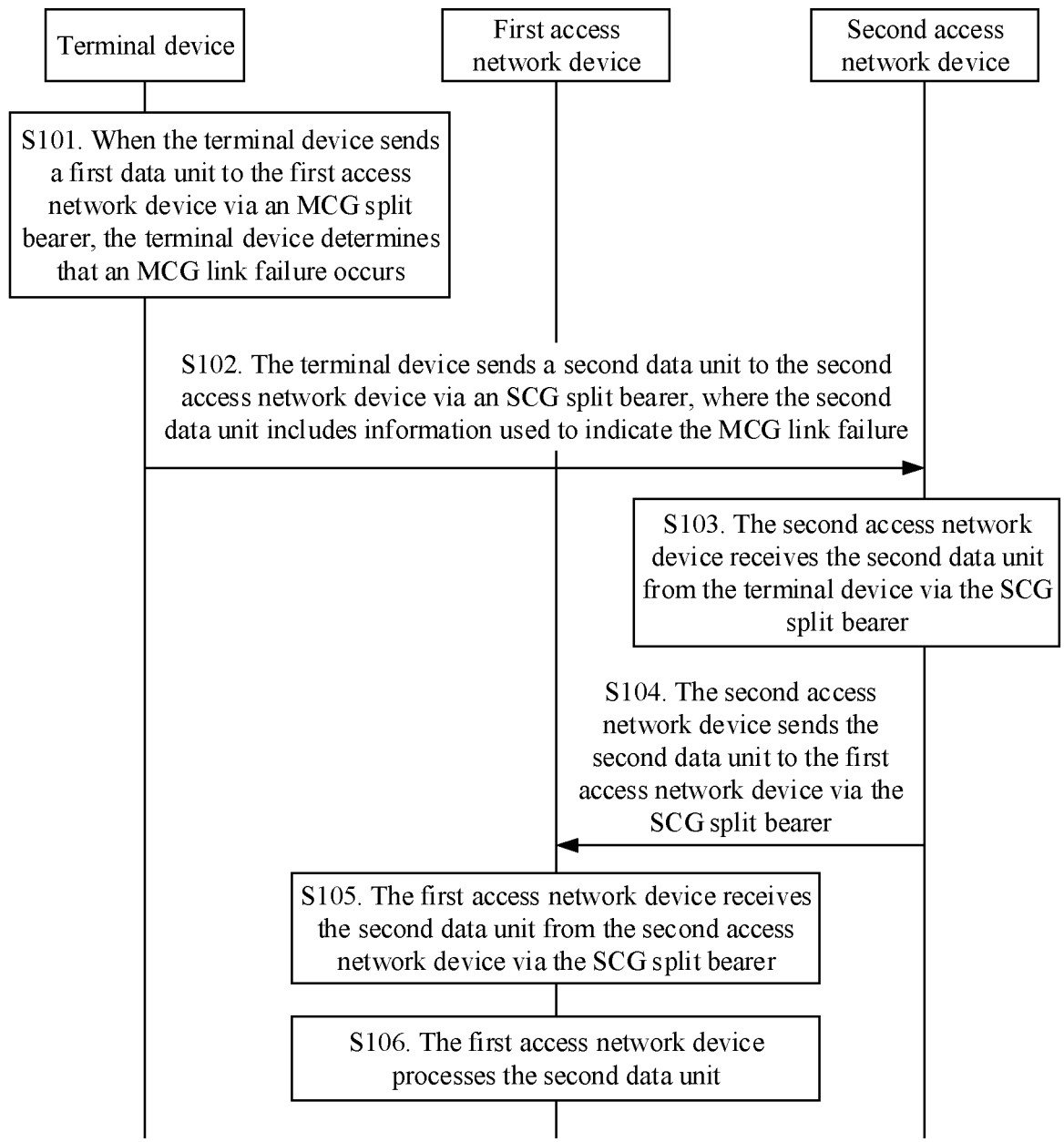
FIG. 6 is a schematic diagram 1 of a communications method according to an embodiment of this application.

With reference to the wireless communications system shown in FIG. 3, an embodiment of this application provides a communication method. The communication method is applied to a scenario in which data is sent via a split bearer. As shown in FIG. 6, the method may include S101 to S106.

S101. When a terminal device sends a first data unit to a first access network device via an MCG split bearer, the terminal device determines that an MCG link failure occurs.

In the following embodiment, the MCG split bearer is a bearer used for data transmission between the terminal device and the first access network device, and the first access network device is a master node. Data such as the first data unit transmitted between the terminal device and the first access network device may be a PDCP protocol data unit (PDU), namely, a PDCP PDU.

In this embodiment of this application, when the terminal device transmits data via the MCG split bearer or an SCG split bearer, a link failure may occur on an air interface. Specifically, the link failure may include an SCG link failure (SCG link failure) and an MCG link failure (MCG link failure). It may be understood that, this embodiment of this application mainly relates to reporting MCG link failure information or an MCG link failure report when the MCG link failure occurs, to notify the first access network device that the MCG link failure occurs between the terminal device and the first access network device.

Optionally, in this embodiment of this application, a cause of the MCG link failure may include at least one of the following: an MCG radio link failure, an MCG reconfiguration failure, a mobility from NR failure, an integrity check failure, an RRC connection reconfiguration failure, and the like. This is not specifically limited in this embodiment of this application.

S102. The terminal device sends a second data unit to a second access network device via the SCG split bearer, where the second data unit includes information used to indicate the MCG link failure.

In this embodiment of this application, the SCG split bearer is a bearer used for data transmission between the terminal device and the second access network device, and the second access network device is a secondary node. Data such as the second data unit transmitted between the terminal device and the second access network device may be a PDCP PDU. When the terminal device determines that the MCG link failure occurs, the terminal device cannot continue to send the first data unit to the first access network device via the MCG split bearer. When the terminal device reports an event that the MCG link failure occurs to the first access network device, the terminal device sends, to the second access network device via the SCG split bearer, the second data unit that carries the information used to indicate the MCG link failure, so that the second access network device sends the second data unit to the first access network device, and the first access network device can learn of the MCG link failure. The information used to indicate the MCG link failure is MCG link failure information or an MCG link failure report (in the following embodiment, the MCG link failure report is the MCG link failure information, and the MCG link failure report and the MCG link failure information are no longer distinguished).

S103. The second access network device receives the second data unit from the terminal device via the SCG split bearer.

S104. The second access network device sends the second data unit to the first access network device via the SCG split bearer.

Optionally, in this embodiment of this application, that the second access network device sends the second data unit to the first access network device via the SCG split bearer may specifically include: The second access network device sends the received second data unit from an RLC layer of the second access network device to a PDCP layer of the first access network device via an SCG RLC bearer in the SCG split bearer.

Figure 7:
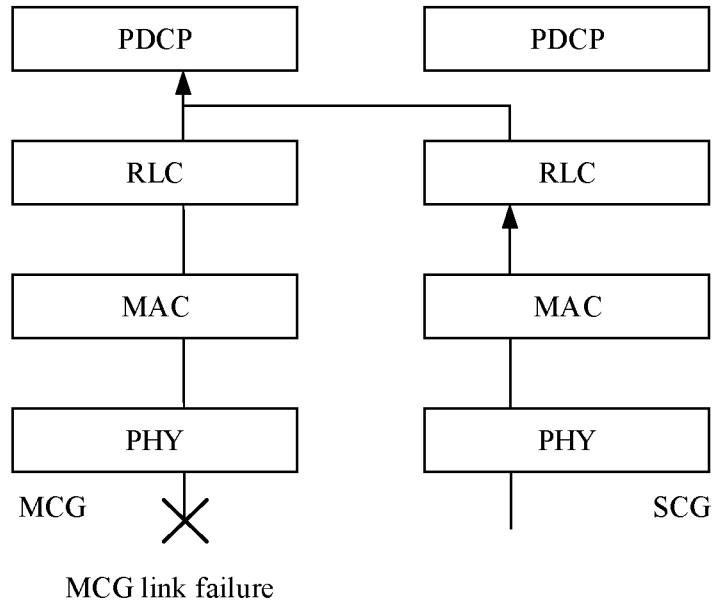
FIG. 7 is a schematic diagram of reporting MCG link failure information according to an embodiment of this application.

For example, FIG. 7 shows a process of receiving the MCG link failure information from perspectives of the first access network device and the second access network device. As shown in FIG. 7, when an MCG link corresponding to the first access network device fails, the first access network device cannot receive the second data unit via the MCG split bearer. After the second access network device receives the second data unit via the SCG split bearer, the second data unit is processed by a PHY layer, a MAC layer, and the RLC layer of the second access network device, and then the second data unit is sent from the RLC layer of the second access network device to the PDCP layer of the first access network device.

S105. The first access network device receives the second data unit from the second access network device via the SCG split bearer.

It should be understood that, that the first access network device receives the second data unit from the second access network device is specifically: The first access network device receives, at the PDCP layer of the first access network device, the second data unit sent by the second access network device from the RLC layer of the second access network device. The second data unit is a PDCP PDU.

S106. The first access network device processes the second data unit.

In this embodiment of this application, that the first access network device processes the second data unit includes: The first access network device completes processing (including at least one of PDCP SN maintenance, data packet header compression and decompression, encryption and decryption, integrity protection, integrity check, PDCP header adding, data routing or replication, and the like) on the second data unit at the PDCP layer of the first access network device, sorts all received data units (including the second data unit) based on PDCP SNs, and then delivers the processed data units (which may be referred to as PDCP SDUs or may be referred to as MCG link failure information) to an RRC layer of the first access network device in a sequence of the PDCP SNs. The RRC layer further processes the MCG link failure information included in the processed data units.

The communication method provided in this embodiment of this application is applied to a scenario in which data is sent via a split bearer. When the terminal device sends the first data unit to the first access network device via the MCG split bearer, the terminal device determines that the MCG link failure occurs. The terminal device sends the second data unit to the second access network device via the SCG split bearer, so that the second access network device sends the second data unit to the first access network device, and the first access network device can complete processing of the second data unit, where the second data unit includes the information used to indicate the MCG link failure. According to the technical solutions provided in this embodiment of this application, the MCG link failure information can be successfully reported.

Figure 8:
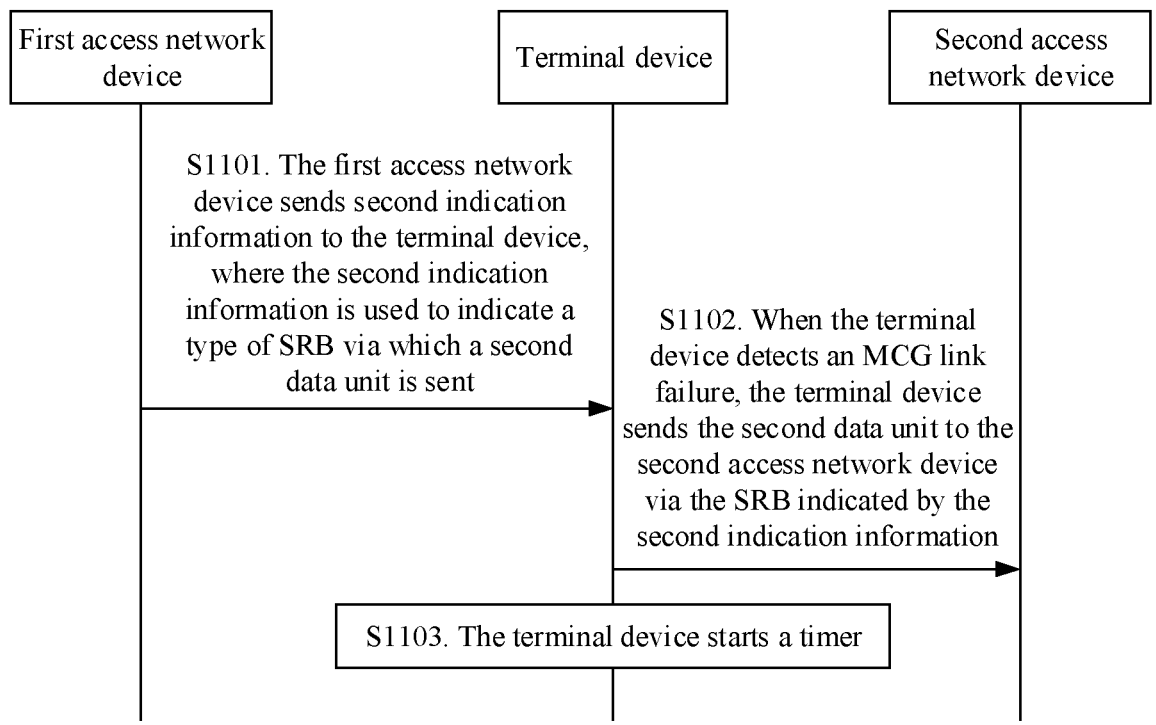
FIG. 8 is a schematic diagram 2 of a communications method according to an embodiment of this application.

As shown in FIG. 8, in this embodiment of this application, before the MCG link failure occurs, the communication method provided in this embodiment of this application may further include the following steps.

S1101. The first access network device sends second indication information to the terminal device, where the second indication information is used to indicate a type of an SRB via which the second data unit is sent.

In this embodiment of this application, the first access network device may indicate the type of the SRB via which the terminal device sends the data unit to the second access network device. Specifically, the second indication information may indicate the terminal device to send the second data unit or the MCG link failure information via an SCG split SRB1, an SCG split SRB2, an SRB3, or another newly defined SRB. In this way, when the terminal device sends the second data unit to the second access network device via the SCG split bearer, the terminal device may send the MCG link failure information via a corresponding SRB.

Optionally, the second indication information may be carried in an RRC reconfiguration message, or may be carried in an RRC connection reconfiguration message, or may be carried in another message. This is not specifically limited in this embodiment of this application.

S1102. When the terminal device detects the MCG link failure, the terminal device sends the second data unit to the second access network device via the SRB indicated by the second indication information.

It may be understood that, in this embodiment of this application, alternatively, a specific type of the SRB via which the terminal device sends the MCG link failure information may be predefined in a protocol. For example, it is predefined in the protocol that the MCG link failure information is sent via the SCG split SRB1. In this way, when the terminal device determines that the MCG link failure occurs, the terminal device may send, via the SCG split SRB1 predefined in the protocol, the second data unit that carries the MCG link failure information.

(Optional) S1103. The terminal device starts a timer.

In this embodiment of this application, when the terminal device determines that the MCG link failure occurs or the terminal device sends the second data unit including the MCG link failure information to the second access network device, the terminal device may start the timer. If the timer expires and the terminal device does not receive a response message from the first access network device or the second access network device, the terminal device considers that MCG link recovery fails. If the terminal device receives a response message from the first access network device or the second access network device while the timer is running, the terminal device stops the timer.

Optionally, when the timer expires and the terminal device does not receive a response message from the first access network device or the second access network device, the terminal device performs an RRC reestablishment procedure, to reestablish an MCG link, so as to recover data transmission via the MCG link.

It may be understood that running duration of the timer may be a value received by the terminal device from the first access network device, or may be a value predefined in a protocol. This is not limited in this embodiment of this application.

Figure 9:
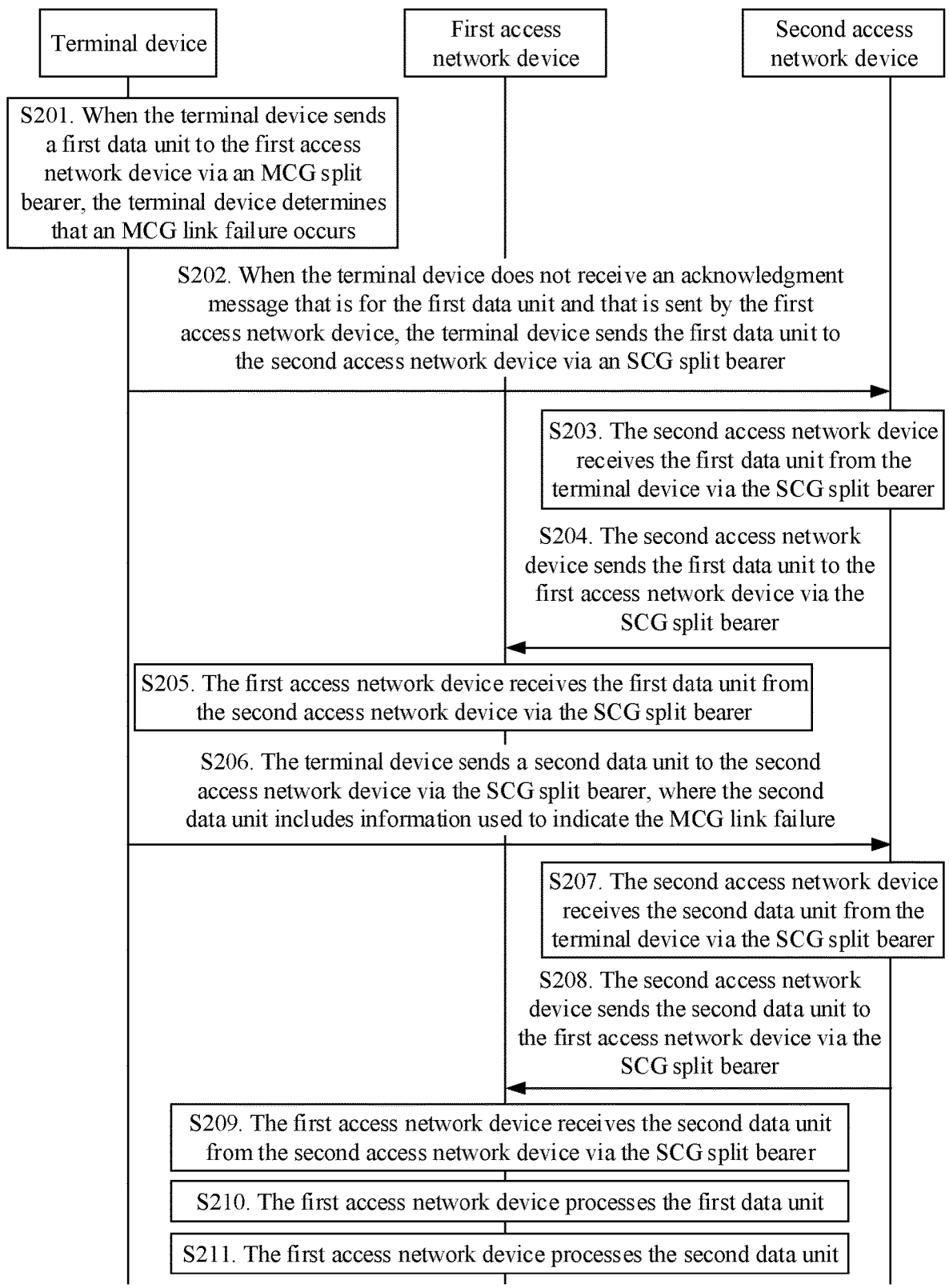
FIG. 9 is a schematic diagram 3 of a communications method according to an embodiment of this application.

As shown in FIG. 9, in an implementation, a communication method provided in this embodiment of this application may be used in a scenario in which data is sent via an SCG split bearer without duplication. The method specifically includes the following steps.

S201. When a terminal device sends a first data unit to a first access network device via an MCG split bearer, the terminal device determines that an MCG link failure occurs.

For a related description of S201, refer to the related description of S101 in the foregoing embodiment. Details are not described herein again.

S202. When the terminal device does not receive an acknowledgment message that is for the first data unit and that is sent by the first access network device, the terminal device sends the first data unit to a second access network device via an SCG split bearer.

When the SCG split bearer is configured as a split bearer without duplication and only an MCG path is configured, the terminal device may send the first data unit only on the MCG split bearer. When the terminal device determines that the MCG link failure occurs, the terminal device resends, via the SCG split bearer, the first data unit for which no acknowledgment message is received. In this case, the terminal device may consider that the SCG split bearer is an SCG split bearer in a split bearer allowing duplication.

S203. The second access network device receives the first data unit from the terminal device via the SCG split bearer.

S204. The second access network device sends the first data unit to the first access network device via the SCG split bearer.

S205. The first access network device receives the first data unit from the second access network device via the SCG split bearer.

In this embodiment of this application, when the terminal device sends the first data unit to the first access network device via the MCG split bearer, the terminal device detects the MCG link failure. In this case, the first data unit sent by the terminal device to the first access network device via the MCG split bearer may fail to be sent to the first access network device, and further, the terminal device may not receive the acknowledgment message that is for the first data unit and that is sent by the first access network device. To ensure continuity of sequence numbers of data units received by the first access network device, the terminal device sends the first data unit to the second access network device via the SCG split bearer, so that the second access network device sends the first data unit to the first access network device.

Likewise, the process in which the first data unit is sent to the second access network device via the SCG split bearer, and then the second access network device sends the first data unit to the first access network device is similar to the process in which the second data unit is sent to the second access network device via the SCG split bearer, and then the second access network device sends the second data unit to the first access network device in the foregoing embodiment. For specific details, refer to related descriptions in the foregoing embodiment. Details are not described herein again.

In this embodiment of this application, when the terminal device receives no acknowledgment message for the first data unit, the terminal device may resend the first data unit to the first access network device via the SCG split bearer in S202 to S205. In this way, it can be ensured that the first access network device successfully receives the first data unit.

S206. The terminal device sends a second data unit to the second access network device via the SCG split bearer, where the second data unit includes information used to indicate the MCG link failure.

S207. The second access network device receives the second data unit from the terminal device via the SCG split bearer.

S208. The second access network device sends the second data unit to the first access network device via the SCG split bearer.

S209. The first access network device receives the second data unit from the second access network device via the SCG split bearer.

Through S206 to S209, the terminal device may successfully send, to the first access network device via the SCG split bearer, the second data unit that carries the MCG link failure information. For other descriptions of S206 to S209, refer to the related descriptions of S102 to S105 in the foregoing embodiment. Details are not described herein again.

It should be noted that a sequence of performing S202 to S205 and S206 to S209 may not be limited in this embodiment of this application. S202 to S205 may be performed before S206 to S209, or S206 to S209 may be performed before S202 to S205, or S202 to S205 and S206 to S209 are simultaneously performed.

S210. The first access network device processes the first data unit.

S211. The first access network device processes the second data unit.

In an implementation, all the steps of S201 to S211 need to be performed. To be specific, when the terminal device determines that the MCG link failure occurs, the terminal device needs to send the second data unit via the SCG split bearer, and also needs to send the first data unit via the SCG split bearer. When the terminal device sends the first data unit and the second data unit via the SCG split bearer, a time sequence of receiving the first data unit and the second data unit by the first access network device via the SCG split bearer is not limited in this embodiment of this application. However, it should be understood that the first data unit is actually a data unit that is sent by the terminal device to the first access network device via the MCG bearer before the terminal device detects the MCG link failure. It can be learned that a PDCP SN of the first data unit is less than a PDCP SN of the second data unit. The first access network device delivers, in order, data units (which may be referred to as PDCP SDUs or MCG link failure information) processed at a PDCP layer, that is, delivers the data units to an RRC layer of the first access network device in ascending order of PDCP SNs. For example, the first access network device first delivers the processed first data unit, and then delivers the processed second data unit.

It should be understood that, the foregoing delivered data units (including the delivered first data unit and/or the delivered second data unit) mean that the first access network device delivers, to the RRC layer of the first access network device, a data unit (which may be referred to as a PDCP SDU or MCG link failure information) obtained after a PDCP SN is removed from a PDCP PDU of the PDCP layer of the first access network device and processing such as decoding, integrity protection, and integrity check is performed. This is also similar in the following embodiments, and details are not described.

In the communication method in this embodiment of this application, if the terminal device detects the MCG link failure when the terminal device sends the first data unit, the first access network device sends, to the first access network device via the SCG split bearer, the information used to indicate the MCG link failure. In addition, the terminal device also sends the first data unit to the first access network device via the SCG split bearer, or the terminal device resends the first data unit to the first access network device via the SCG split bearer, so that the second access network device sends the second data unit and the first data unit to the first access network device. It can be learned that according to this solution, continuity of data units received by the first access network device can be ensured. In this way, the MCG link failure information can be successfully reported.

In another implementation, S202 to S205 may not be performed. To be specific, when the terminal device determines that the MCG link failure occurs, the terminal device sends only the second data unit via the SCG split bearer, and the terminal device does not send the first data unit via the SCG split bearer. Even if the first data unit is still stored in buffer of a PDCP layer of the terminal device in a case of the MCG link failure, the terminal device does not send the first data unit via the SCG split bearer, either. It may be understood that, when the SCG split bearer is configured as a split bearer without duplication and only an MCG path is configured, usually, the first access network device cannot receive, from the second access network device, data transmitted via the SCG split bearer. However, this embodiment of this application may specify that: If the first access network device receives the second data unit from the second access network device, the first access network device preferentially delivers the processed second data unit to the RRC layer of the first access network device. It may also be understood as follows: When the first access network device receives the second data unit via the SCG split bearer, the first access network device determines, by default, that the second data unit includes the information used to indicate the MCG link failure. Regardless of whether SNs of PDCP PDUs of the first access network device are continuous, the PDCP layer of the first access network device does not perform a reordering function and/or an in-order delivery function, or the PDCP layer of the first access network device does not perform a reordering function and/or an in-order delivery function on the second data unit, but delivers the processed second data unit to the RRC layer.

According to the communication method provided in this embodiment of this application, the terminal device sends, to the first access network device via the SCG split bearer, the data unit including the information used to indicate the MCG link failure. According to this solution, it can be ensured that after receiving the data unit, the first access network device preferentially processes the data unit. In this way, the MCG link failure information can be successfully reported.

Figure 10:
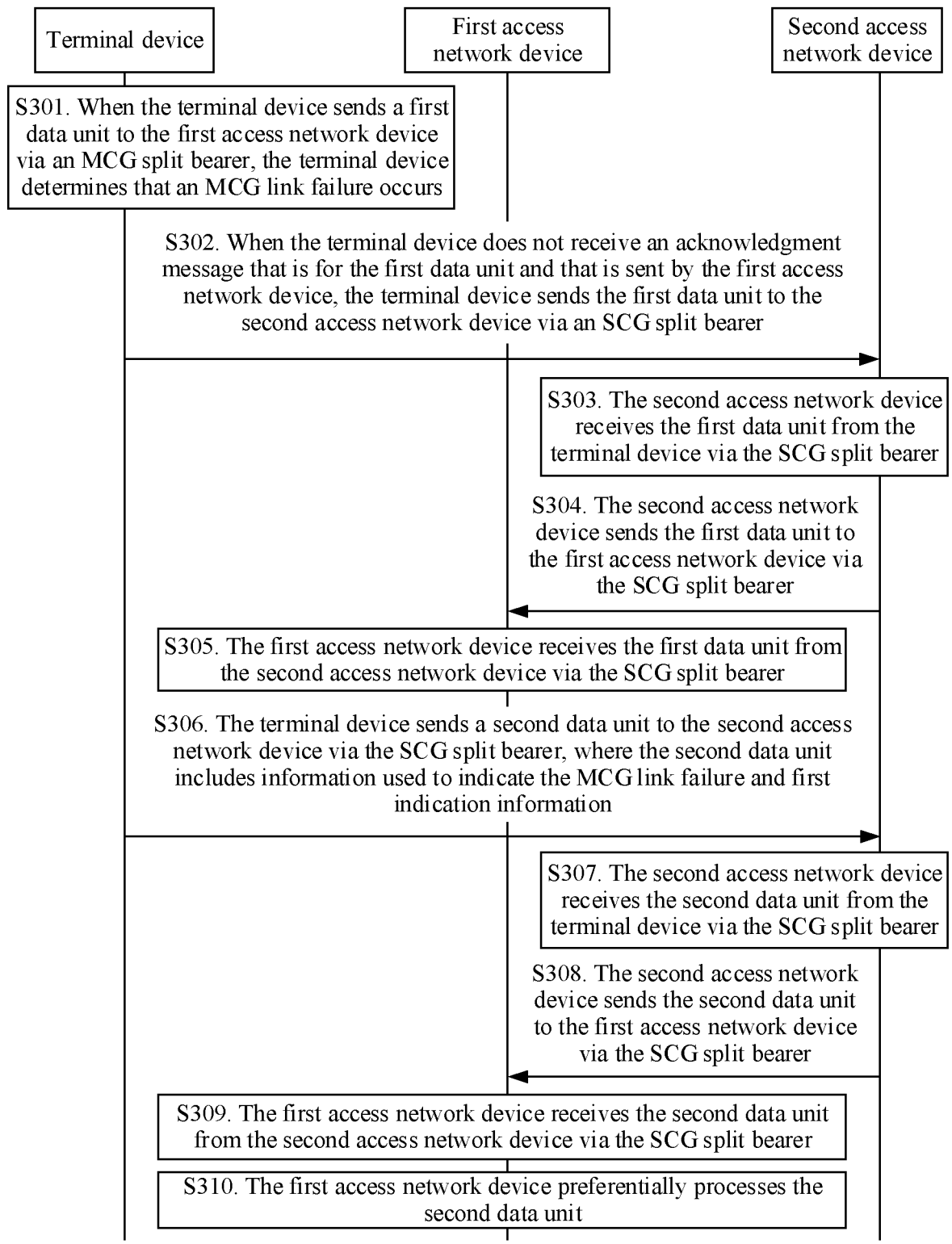
FIG. 10 is a schematic diagram 4 of a communications method according to an embodiment of this application.

As shown in FIG. 10, in another implementation, a communication method provided in an embodiment of this application may include the following steps.

S301. When a terminal device sends a first data unit to a first access network device via an MCG split bearer, the terminal device determines that an MCG link failure occurs.

For a related description of S301, refer to the related description of S101 in the foregoing embodiment. Details are not described herein again.

Optionally, in S302, when the terminal device does not receive an acknowledgment message that is for the first data unit and that is sent by the first access network device, the terminal device sends the first data unit to a second access network device via an SCG split bearer.

Optionally, in S303, the second access network device receives the first data unit from the terminal device via the SCG split bearer.

Optionally, in S304, the second access network device sends the first data unit to the first access network device via the SCG split bearer.

Optionally, in S305, the first access network device receives the first data unit from the second access network device via the SCG split bearer.

S306. The terminal device sends a second data unit to the second access network device via the SCG split bearer, where the second data unit includes information used to indicate the MCG link failure and first indication information.

The information used to indicate the MCG link failure may be referred to as MCG link failure information or an MCG link failure report. The first indication information is used to indicate to preferentially process the second data unit, or the first indication information is used to indicate that reordering and/or in-order delivery do not need to be performed, or the first indication information is used to indicate that the second data unit is used to send the MCG link failure information. When receiving the second data unit, a PDCP layer of the first access network device does not need to perform reordering and/or in-order delivery based on the first indication information, or a PDCP layer of the first access network device does not perform a reordering function and/or an in-order delivery function on the second data unit. Instead, after receiving the second data unit, the PDCP layer of the first access network device preferentially processes the second data unit, and delivers the processed second data unit to an RRC layer.

In an implementation, the first indication information is carried in one or more of the following information: a MAC CE header, an RLC header, or a PDCP header. This is not specifically limited in this embodiment of this application.

In another implementation, the second data unit is a PDCP control protocol data unit (namely, a PDCP control PDU) for a signalling radio bearer. It may be understood that, when the second data unit is a PDCP control protocol data unit, the second data unit may include the information used to indicate the MCG link failure and the first indication information, or include only the information used to indicate the MCG link failure. The PDCP control protocol data unit is introduced into a signalling radio bearer, and the information (for example, an MCG link failure report) used to indicate the MCG link failure and the first indication information are carried in the PDCP control protocol data unit. Specifically, one or more reserved bits in a header of the PDCP control protocol data unit are defined to carry the first indication information, and a payload of the PDCP control protocol data unit includes the information used to indicate the MCG link failure.

Optionally, the first bit in the reserved bits (for example, four reserved bits) in the header of the PDCP control protocol data unit may be used to carry the first indication information, or one or more other reserved bits may be used to carry the first indication information. This is not limited in this embodiment of this application.

Figure 10A:
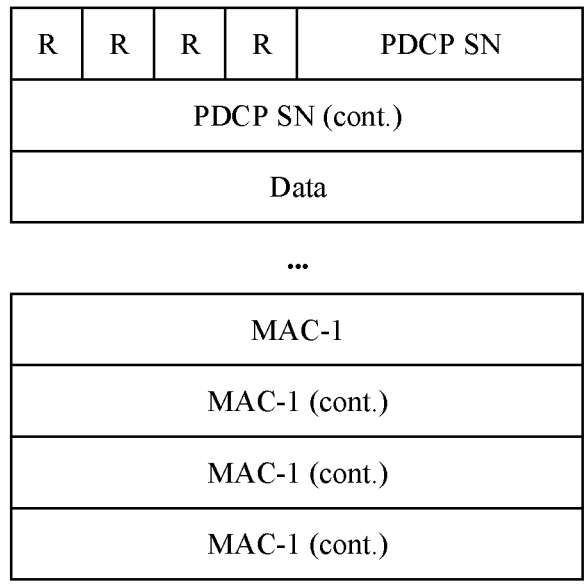
FIG. 10A is a schematic diagram of a format of a PDCP data PDU format for SRBs according to an embodiment of this application.

It should be noted that, in this embodiment of this application, a format of the PDCP control protocol data unit in the SRB is similar to a format of a PDCP control protocol data unit (namely, a PDCP control PDU) in a DRB. For the format of the PDCP control protocol data unit, refer to a format of a PDCP data protocol data unit. FIG. 10A shows an existing PDCP data PDU format for SRBs (PDCP Data PDU format for SRBs). Four bits marked as "R" are four reserved bits.

It may be understood that, during specific implementation, when only the first bit in the reserved bits is used for indication, the first bit is used as a D/C field parameter, and the D/C field parameter is used to indicate whether the data unit is a PDCP control PDU or a PDCP data PDU. In this embodiment of this application, when a value of a D/C field is "C", it indicates that the data unit is a PDCP control PDU, and a payload of the data unit includes the information used to indicate the MCG link failure, and indicates that the data unit needs to be preferentially processed, that is, indicates that the MCG link failure information needs to be preferentially processed. Optionally, if a remaining reserved bit is further used, the remaining bit may be used as a "PDU type" parameter (that is, a data unit type) to indicate a type of control information included in the PDCP control PDU. In this embodiment of this application, one possible value of the "PDU type" is set to the MCG link failure information, and other possible values of the "PDU type" may be reserved for future extension such as a PDCP status report (PDCP status report). Other possible extension is not limited in this embodiment of this application.

S307. The second access network device receives the second data unit from the terminal device via the SCG split bearer.

S308. The second access network device sends the second data unit to the first access network device via the SCG split bearer.

S309. The first access network device receives the second data unit from the second access network device via the SCG split bearer.

For related descriptions of S307 to SD309, refer to the related descriptions of S103 to S105 in the foregoing embodiment. Details are not described herein again.

S310. The first access network device preferentially processes the second data unit.

After receiving the second data unit, the first access network device parses a header of the second data unit to obtain the first indication information, then preferentially processes the second data unit based on the indication of the first indication information, and delivers the processed second data unit to the RRC layer.

In this embodiment of this application, because the second data unit carries the first indication information or the second data unit is a corresponding PDCP control PDU, the first access network device does not need to determine whether the first data unit is successfully received, and directly preferentially processes the second data unit. A PDCP SN of the first data unit is less than a PDCP SN of the second data unit. For example, the first access network device receives the first data unit and the second data unit, where a sequence number PDCP SN of the first data unit is a, and a sequence number PDCP SN of the second data unit is a+1. The first access network device determines that the second data unit carries the first indication information, and the first access network device preferentially processes the second data unit whose PDCP SN is a+1. Alternatively, the first access network device does not successfully receive the first data unit, but receives the second data unit. Similarly, a sequence number PDCP SN of the first data unit is a, and a sequence number PDCP SN of the second data unit is a+1. The second data unit carries the first indication information, and the first access network device directly processes the second data unit.

It should be understood that, in a scenario in which data is sent via a split bearer without duplication, S302 to S305 are optional steps. To be specific, when determining that the MCG link failure occurs, the terminal device sends only the second data unit via the SCG split bearer, and uses the second data unit to carry the first indication information, to indicate to preferentially process the second data unit, and the terminal device does not send the first data unit via the SCG split bearer. In a scenario in which data is sent via a split bearer allowing duplication, all steps of S302 to S310 need to be performed. To be specific, when determining that the MCG link failure occurs, the terminal device sends the second data unit (that carries the first indication information) via the SCG split bearer, and also sends the first data unit via the SCG split bearer. However, after receiving the first data unit and the second data unit, the first access network device preferentially processes the second data unit based on the first indication information.

The foregoing mainly describes the solutions provided in the embodiments of the present invention from a perspective of interaction between network elements. It may be understood that, to implement the foregoing functions, the network elements, such as the terminal device and the first access network device, include a corresponding hardware structure and/or software module for performing each of the functions. A person skilled in the art should be easily aware that units, algorithms, and steps in the examples described with reference to the embodiments disclosed in this specification can be implemented by hardware or a combination of hardware and computer software in the embodiments of the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application In this embodiment of the present invention, the terminal device, the first access network device, or the like may be divided into function modules based on the foregoing method example. For example, each function modules may be obtained through division based on each corresponding function, or two or more functions may be integrated into one processing module. The integrated module may be implemented in a form of hardware, or may be implemented in a form of a software function module. It should be noted that, in the embodiments of the present invention, division into the modules is an example, and is merely logical function division. During actual implementation, another division manner may be used.

Figure 11:
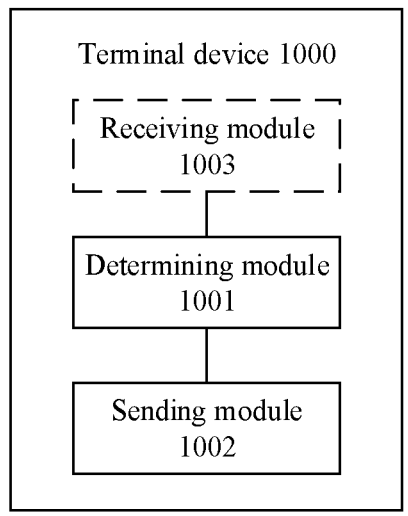
FIG. 11 is a schematic structural diagram 1 of a terminal device according to an embodiment of this application.

When each function module is obtained through division based on each corresponding function, FIG. 11 is a possible schematic structural diagram of a terminal device in the foregoing embodiments. As shown in FIG. 11, a terminal device 1000 may include a determining module 1001 and a sending module 1002. The determining module 1001 may be configured to support the terminal device 1000 in performing S101, S201, and S301 in the foregoing method embodiments. The sending module 1002 may be configured to support the terminal device 1000 in performing S102, S1102, S202, S206, S302, and S306 in the foregoing method embodiments. Optionally, as shown in FIG. 11, the terminal device 1000 may further include a receiving module 1003. The receiving module 1003 may be configured to support the terminal device 1000 in receiving the second indication information sent by the first access network device. All related content of the steps in the foregoing method embodiments may be cited in function descriptions of corresponding function modules, and details are not described herein again.

Figure 12:
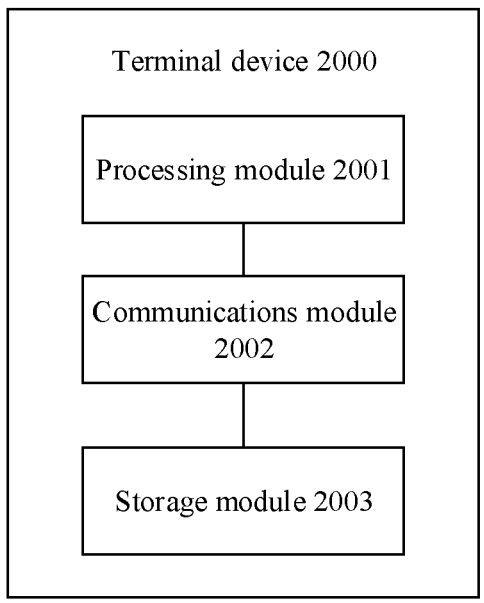
FIG. 12 is a schematic structural diagram 2 of a terminal device according to an embodiment of this application.

When an integrated unit is used, FIG. 12 is a possible schematic structural diagram of the terminal device in the foregoing embodiments. As shown in FIG. 12, a terminal device 2000 may include a processing module 2001 and a communications module 2002. The processing module 2001 may be configured to control and manage an action of the terminal device 2000. For example, the processing module 2001 may be configured to support the terminal device 2000 in performing S101, S1103, S201, and S301 in the foregoing method embodiments and/or another process of the technology described in this specification. The communications module 2002 may be configured to support the terminal device 2000 in communicating with another network entity. For example, the communications module 2002 may be configured to support the terminal device 2000 in performing S102, S1102, S202, S206, S302, and S306 in the foregoing method embodiments. Optionally, as shown in FIG. 12, the terminal device 2000 may further include a storage module 2003, configured to store program code and data of the terminal device 2000.

The processing module 2001 may be a processor or a controller (for example, may be the processor 31 shown in FIG. 5). For example, the processing module 2001 may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing module 2001 may implement or execute various example logical blocks, modules, and circuits described with reference to content disclosed in the embodiments of the present invention. The processor may alternatively be a combination of processors implementing a computing function, for example, a combination of one or more microprocessors, or a combination of a DSP and a microprocessor. The communications module 2002 may be a transceiver, a transceiver circuit, a communications interface, or the like (for example, may be the RF circuit 32 shown in FIG. 5). The storage module 2003 may be a memory (for example, may be the memory 34 shown in FIG. 5).

When the processing module 2001 is the processor, the communications module 2002 is the transceiver, and the storage module 2003 is the memory, the processor, the transceiver, and the memory may be connected through a bus. The bus may be a peripheral component interconnect (PCI) bus, an extended industry standard architecture (EISA) bus, or the like. The bus may be classified into an address bus, a data bus, a control bus, and the like.

Figure 13:
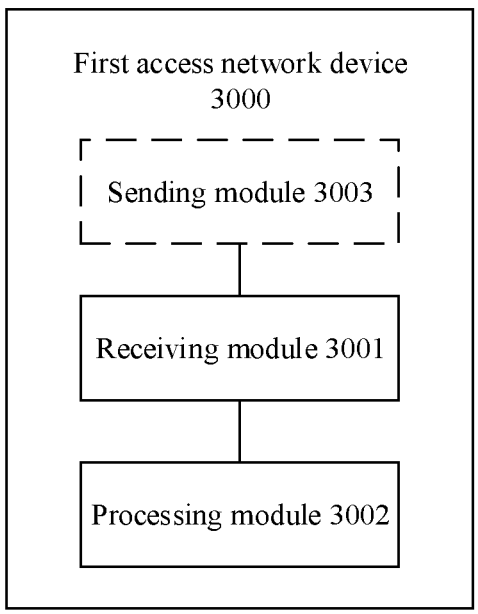
FIG. 13 is a schematic structural diagram 1 of a first access network device according to an embodiment of this application.

When each function module is obtained through division based on each corresponding function, FIG. 13 is a possible schematic structural diagram of a first access network device in the foregoing embodiments. As shown in FIG. 13, the first access network device 3000 may include a receiving module 3001 and a processing module 3002. The receiving module 3001 may be configured to support the first access network device 3000 in performing S105, S205, S209, S305, and S309 in the foregoing method embodiments. The processing module 3002 may be configured to support the first access network device 3000 in performing S106, S210, S211, and S310 in the foregoing method embodiments. Optionally, as shown in FIG. 13, the first access network device 3000 may further include a sending module 3003. The sending module 3003 may be configured to support the first access network device 3000 in performing S1101 in the foregoing method embodiments. All related content of the steps in the foregoing method embodiments may be cited in function descriptions of corresponding function modules, and details are not described herein again.

Figure 14:
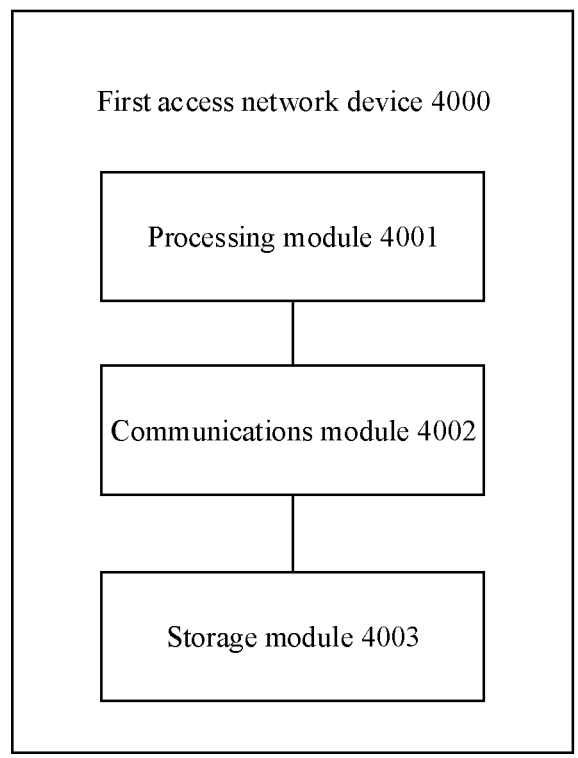
FIG. 14 is a schematic structural diagram 2 of a first access network device according to an embodiment of this application.

When an integrated unit is used, FIG. 14 is a possible schematic structural diagram of the first access network device in the foregoing embodiments. As shown in FIG. 14, the first access network device 4000 may include a processing module 4001 and a communications module 4002. The processing module 4001 may be configured to control and manage an action of the first access network device 4000. For example, the processing module 4001 may be configured to support the first access network device 4000 in performing S106, S210, S211, and S310 in the foregoing method embodiments. The communications module 4002 may be configured to support the first access network device 4000 in communicating with another network entity. For example, the communications module 4002 may be configured to support the first access network device 4000 in performing S105, S1101, S205, S209, S305, and S309 in the foregoing method embodiments. Optionally, as shown in FIG. 14, the first access network device 4000 may further include a storage module 4003, configured to store program code and data of the first access network device 4000.

The processing module 4001 may be a processor or a controller (for example, may be the processor in the part 21 shown in FIG. 4), and for example, may be a CPU, a general purpose processor, a DSP, an ASIC, an FPGA or another programmable logic device, a transistor logic device, a hardware component, or any combination thereof. The processing module 4001 may implement or execute various example logical blocks, modules, and circuits described with reference to content disclosed in the embodiments of the present invention. The processor may alternatively be a combination of processors implementing a computing function, for example, a combination of one or more microprocessors, or a combination of a DSP and a microprocessor. The communications module 4002 may be a transceiver, a transceiver circuit, a communications interface, or the like (for example, may be the radio frequency unit in the part 20 shown in FIG. 4). The storage module 4003 may be a memory (for example, may be the memory in the part 21 shown in FIG. 4).

When the processing module 4001 is the processor, the communications module 4002 is the transceiver, and the storage module 4003 is the memory, the processor, the transceiver, and the memory may be connected through a bus. The bus may be a PCI bus, an EISA bus, or the like. The bus may be classified into an address bus, a data bus, a control bus, and the like.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer instruction is loaded and executed on a computer, all or some of the procedures or functions according to the embodiments of this application are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a magnetic disk, or a magnetic tape), an optical medium (for example, a digital video disc (DVD)), a semiconductor medium (for example, a solid state drive (SSD)), or the like.

The foregoing descriptions about implementations allow a person skilled in the art to clearly understand that, for the purpose of convenient and brief description, division into only the foregoing function modules is used as an example for illustration. In actual application, the foregoing functions can be allocated to different function modules for implementation based on a requirement. That is, an inner structure of an apparatus is divided into different function modules to implement all or some of the functions described above. For a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the foregoing apparatus embodiments are merely an example. For example, the division into modules or units is merely logical function division. During actual implementation, another division manner may be used. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the steps of the method according to the embodiments of this application. The foregoing storage medium includes any medium that can store program code, such as a flash memory, a removable hard disk, a read-only memory, a random access memory, a magnetic disk, or a compact disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method, comprising:
   receiving, by a packet data convergence protocol (PDCP) layer of a first access network device from a terminal device via a secondary cell group (SCG) of a second access network device, a data unit comprising master cell group (MCG) link failure information;
   processing, by the PDCP layer of the first access network device, the data unit, the processing comprising determining that the data unit includes the MCG link failure information; and
   delivering, by the PDCP layer of the first access network device in response to the determination, the processed data unit to a radio resource control (RRC) layer of the first access network device without performing at least one of a reordering function or an in-order delivery function on the data unit.

2. The method according to claim 1, wherein the method further comprises:
sending, by the first access network device, timer configuration information to the terminal device, wherein the timer configuration information comprises running duration of a timer of the terminal device, wherein the timer is started when the MCG link failure is detected by the terminal device, and the timer is stopped when a response message of the MCG link failure information from the first access network device is received by the terminal device via the second access network device while the timer is running.

3. The method according to claim 1, wherein
the MCG link failure information is sent by the terminal device to the first access network device via a split signaling radio bearer 1 (SRB1) or a signaling radio bearer 3 (SRB3).

4. The method according to claim 3, wherein
if the split SRB1 is configured for the terminal device, the MCG link failure information is sent by the terminal device to the first access network device via the split SRB1; or
if the split SRB1 is not configured for the terminal device, but the SRB3 is configured for the terminal device, the MCG link failure information is sent by the terminal device to the first access network device via the SRB3.

5. The method according to claim 1, wherein
the first access network device receives first indication information from the second access network device, wherein the first indication information is sent by the terminal device to the second access network device via the SCG and the first indication information is used to indicate to preferentially process the MCG link failure information.

6. The method according to claim 1, wherein the data unit further comprises first indication information indicating to preferentially process the second data unit.

7. The method according to claim 6, wherein the first indication information is carried in one or more of the following information: a media access control control element (MAC CE) header, a radio link control (RLC) header, or a PDCP header.

8. The method according to claim 1, wherein the data unit further comprises first indication information indicating that reordering and/or in-order delivery do not need to be performed.

9. The method according to claim 8, wherein the first indication information is carried in one or more of the following information: a media access control control element (MAC CE) header, a radio link control (RLC) header, or a PDCP header.

10. An apparatus, applied for a first access network device, comprising:
at least one processor and a memory storing instructions for execution by the at least one processor;
wherein, when executed, the instructions cause the apparatus to perform operations comprising:
receive, by a packet data convergence protocol (PDCP) layer of a first access network device, a data unit comprising master cell group (MCG) link failure information from a terminal device via a secondary cell group (SCG) of a second access network device;
process, by the PDCP layer of the first access network device, the data unit, the processing comprising determining that the data unit includes the MCG link failure information, and
deliver, by the PDCP layer of the first access network device in response to the determination, the processed data unit to a radio resource control (RRC) layer of the first access network device without performing at least one of a reordering function or an in-order delivery function on the data unit.

11. The apparatus according to claim 10, wherein, when executed, the instructions cause the apparatus to perform operations comprising:
send, by the first access network device, timer configuration information to the terminal device, wherein the timer configuration information comprises running duration of a timer of the terminal device, wherein the timer is started when the MCG link failure is detected by the terminal device, and the timer is stopped when a response message of the MCG link failure information from the first access network device is received by the terminal device via the second access network device while the timer is running.

12. The apparatus according to claim 10, wherein
the MCG link failure information is sent by the terminal device to the first access network device via a split signaling radio bearer 1 (SRB1) or a signaling radio bearer 3 (SRB3).

13. The apparatus according to claim 12, wherein
if the split SRB1 is configured for the terminal device, the MCG link failure information is sent by the terminal device to the first access network device via the split SRB1; or
if the split SRB1 is not configured for the terminal device, but the SRB3 is configured for the terminal device, the MCG link failure information is sent by the terminal device to the first access network device via the SRB3.

14. The apparatus according to claim 10, wherein
the first access network device receives first indication information from the second access network device, wherein the first indication information is sent by the terminal device to the second access network device via the SCG and the first indication information is used to indicate to preferentially process the MCG link failure information.

15. The apparatus according to claim 10, wherein the data unit further comprises first indication information indicating to preferentially process the second data unit.

16. The apparatus according to claim 15, wherein the first indication information is carried in one or more of the following information: a media access control control element (MAC CE) header, a radio link control (RLC) header, or a PDCP header.

17. The apparatus according to claim 10, wherein the data unit further comprises first indication information indicating that reordering and/or in-order delivery do not need to be performed.

18. The apparatus according to claim 17, wherein the first indication information is carried in one or more of the following information: a media access control control element (MAC CE) header, a radio link control (RLC) header, or a PDCP header.

* * * * *